(12) United States Patent
Ijaz et al.

(10) Patent No.: US 12,447,863 B2
(45) Date of Patent: Oct. 21, 2025

(54) SUPPLYING POWER TO AN ELECTRIC VEHICLE

(71) Applicant: Our Next Energy, Inc., Novi, MI (US)

(72) Inventors: Mujeeb Ijaz, West Bloomfield, MI (US); Brian Moorhead, Westland, MI (US)

(73) Assignee: Our Next Energy, Inc., Novi, MI (US)

( * ) Notice: Subject to any disclaimer, the term of this patent is extended or adjusted under 35 U.S.C. 154(b) by 0 days.

(21) Appl. No.: 18/388,989

(22) Filed: Nov. 13, 2023

(65) Prior Publication Data
US 2024/0239240 A1  Jul. 18, 2024

Related U.S. Application Data

(63) Continuation of application No. 17/478,368, filed on Sep. 17, 2021, now Pat. No. 11,813,962.

(60) Provisional application No. 63/161,822, filed on Mar. 16, 2021, provisional application No. 63/089,990, filed on Oct. 9, 2020.

(51) Int. Cl.
*B60L 58/22* (2019.01)
*B60L 53/20* (2019.01)
*B60L 58/12* (2019.01)
*B60L 58/16* (2019.01)
*B60L 58/20* (2019.01)
*H02J 7/00* (2006.01)
*H02J 7/14* (2006.01)

(52) U.S. Cl.
CPC ............... *B60L 58/22* (2019.02); *B60L 53/20* (2019.02); *B60L 58/12* (2019.02); *B60L 58/16* (2019.02); *B60L 58/20* (2019.02); *H02J 7/0016* (2013.01); *H02J 7/0048* (2020.01); *H02J 7/005* (2020.01); *H02J 7/1423* (2013.01); *B60L 2210/10* (2013.01)

(58) Field of Classification Search
CPC .......... B60L 58/22; B60L 53/20; B60L 58/12; B60L 58/16; B60L 58/20; B60L 2210/10; B60L 2240/423; B60L 2240/425; B60L 15/2045; B60L 53/16; H02J 7/0016; H02J 7/0048; H02J 7/005; H02J 7/1423; H02J 7/0025; H02J 7/0029; H02J 7/342; H02J 2310/48; H02J 7/0013; Y02E 60/10; H01M 10/482; H01M 10/425; H01M 10/441; H01M 2220/20; Y02T 10/70; Y02T 10/7072; Y02T 90/14
USPC ........................................................ 320/125
See application file for complete search history.

(56) References Cited

U.S. PATENT DOCUMENTS 7,779,943 B2    8/2010 Seidel
8,768,553 B2 *  7/2014 Cho ..................... B60L 50/62
                                          180/65.21

(Continued)

FOREIGN PATENT DOCUMENTS

CN      112572164 A   *  3/2021  ............... B60L 50/60
JP      2013095246 A  *  5/2013  ............... Y02T 10/62
WO     WO-2015152092 A1 * 10/2015 ............. C01B 32/05

OTHER PUBLICATIONS

CN 112572164 A + Machine Translation (Year: 2021).*
WO 2015152092 A1 + Machine Translation (Year: 2015).*

*Primary Examiner* — M Baye Diao
(74) *Attorney, Agent, or Firm* — Butzel Long

(57) ABSTRACT

A power supply system that utilizes a hybrid architecture to enable low cycle-life, high energy density chemistries to be used in rechargeable batteries to extend the range of a traction battery.

20 Claims, 15 Drawing Sheets

(56) References Cited

U.S. PATENT DOCUMENTS

| | | | |
|---|---|---|---|
| 9,160,190 B2* | 10/2015 | Moorhead | G01R 31/3648 |
| 10,661,679 B2 | 5/2020 | Botts | |
| 10,894,484 B2* | 1/2021 | Han | B60L 53/67 |
| 10,928,457 B2 | 2/2021 | Wampler, II | |
| 10,946,750 B2 | 3/2021 | Takatsuka | |
| 11,027,624 B2* | 6/2021 | Grace | H02J 7/007194 |
| 11,065,978 B2* | 7/2021 | Aykol | B60L 3/12 |
| 11,279,236 B2* | 3/2022 | Moon | B60L 7/14 |
| 11,535,122 B2 | 12/2022 | Sastinsky | |
| 2012/0275799 A1* | 11/2012 | Abraham | B60L 58/16 |
| | | | 398/201 |
| 2014/0265554 A1* | 9/2014 | Yang | B60L 53/14 |
| | | | 307/9.1 |
| 2017/0253127 A1* | 9/2017 | Ciaccio | B60K 6/28 |
| 2020/0269722 A1* | 8/2020 | Aykol | G05B 13/0265 |
| 2020/0369156 A1* | 11/2020 | Moon | B60L 7/18 |
| 2021/0188252 A1* | 6/2021 | Lu | B60W 40/12 |

\* cited by examiner

SUPPLYING POWER TO AN ELECTRIC VEHICLE

CROSS-REFERENCE TO RELATED APPLICATIONS

This application is a continuation of U.S. application Ser. No. 17/478,358, filed Sep. 17, 2021, now U.S. Pat. No. 11,813,962, which claims the priority benefit of U.S. Application Nos. 63/089,990, filed Oct. 9, 2020 and 63/161,822, filed Mar. 16, 2021, each of which is incorporated by reference in its entirety.

TECHNICAL FIELD

The disclosure relates generally to systems, methods, and computer programs for supplying power to an electric vehicle and, more specifically, to systems, methods, and computer programs operating a power supply system of an electric vehicle through high energy density batteries configured to extend the range of a traction battery.

The disclosure also relates to a method, system, and computer program product for intelligent determination of the level of output power to obtain from individual batteries of a hybrid architecture to achieve a range or distance goal while maintaining or maximizing the merits provided by a hybrid architecture including ensuring safety, maximizing battery life and maximizing battery capacity in electric vehicles.

BACKGROUND

Power supply systems used in electric vehicles are usually connected in series using a single battery pack or multiple battery packs. These batteries are usually rechargeable batteries and are typically lithium-ion batteries.

Lithium-ion batteries have been widely used in electric vehicles and storage as green energy without environmental pollution due to their high output voltage, good cycle performance, low self-discharge rate, fast charge and discharge, and high charging efficiency A traditional battery parameter update relies on a Battery Management System (BMS). The main functions of BMS include: monitoring battery voltage, current, temperature among other data points; estimating battery SOC (State of Charge), SOH (State of Health), SOE (State of Energy), SOP (State of Power), RM (Remaining Mileage), running diagnostics; protecting the battery's health and executing battery balancing management and battery thermal management processes To more accurately measure the battery's parameters, the conventional technical solution often pre-stores an OCV (Opening Circuit Voltage)-SOC curve for checking the estimated battery SOC. Some data may be uploaded to a cloud backup by the BMS so that a manufacturer or the after-sales can retrieve the data analysis fault and the battery history information.

It is usually difficult to maintain a precise balance of the SOC and balance the battery characteristics between the battery cells and the battery pack/module. Old and new batteries, batteries of different capacities, or battery packs of different characteristics cannot be used together; failure of one battery core or pack can cause the entire battery system's failure. These problems decrease efficiency and range and have greatly increased the production and screening costs of battery systems.

Another common problem that has arisen in battery technology development involves the trade-off between energy density, the number of battery cycles available during useful life, and the battery's performance. No known technology presently exists that provides a battery solution or energy storage solution with favorable energy density, high performance and a large number of cycles through which the battery can be charged and discharged during its useful life.

BRIEF DESCRIPTION OF THE DRAWINGS

To easily identify the discussion of any particular element or act, the most significant digit or digits in a reference number refer to the figure number in which that element is first introduced. Certain novel features believed characteristic of the power supply system are outlined in the appended claims. The power supply system itself, however, as well as a preferred mode of use, further non-limiting objectives, and advantages thereof, will best be understood by reference to the following detailed description of the illustrative embodiments when read in conjunction with the accompanying drawings, wherein:

DETAILED DESCRIPTION

Figure 1:
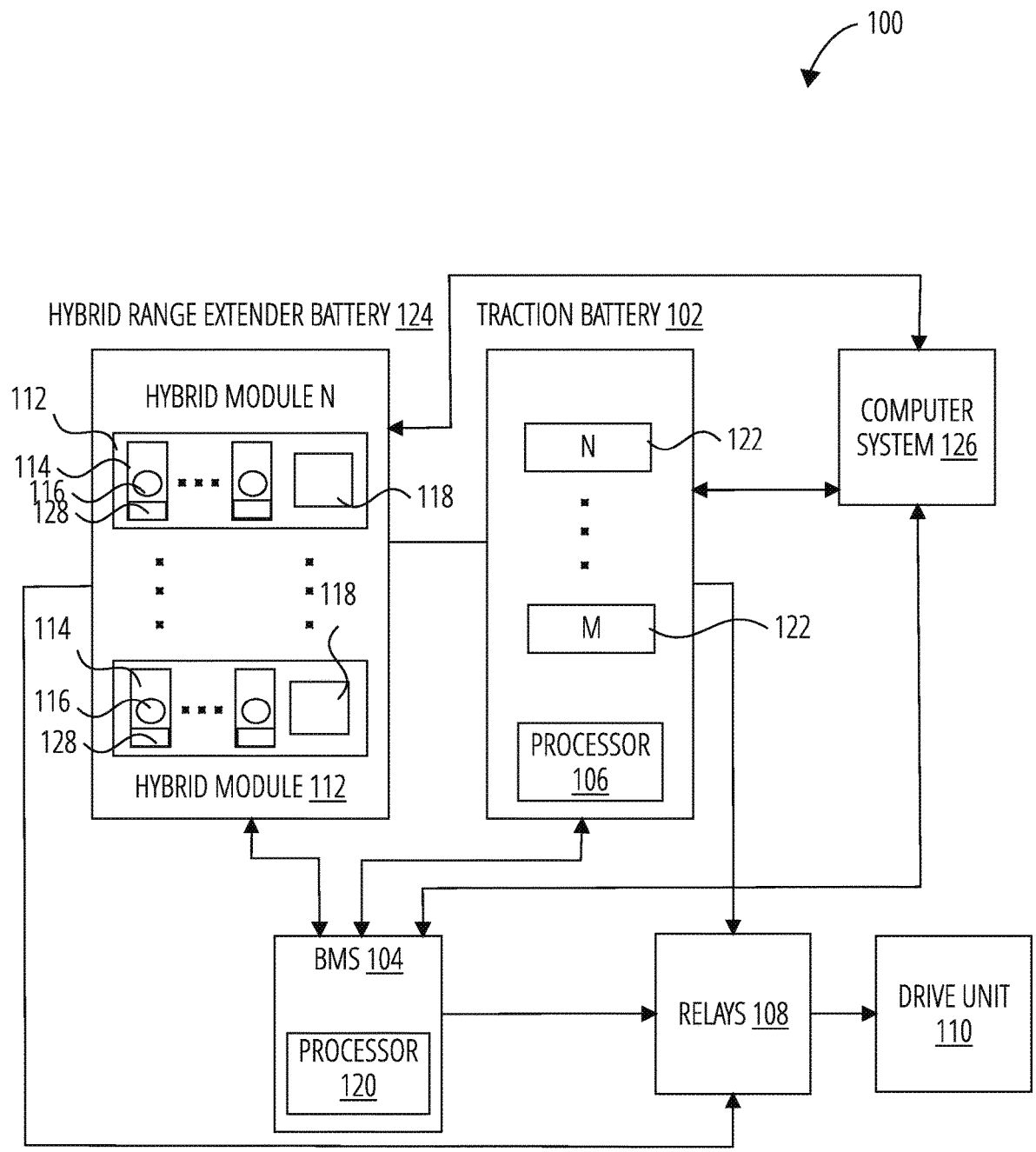
FIG. 1 depicts a block diagram of a power supply system in which illustrative embodiments may be implemented.

The illustrative embodiments recognize that the presently available solutions do not fully address the problems discussed above or provide adequate solutions. Electric vehicles usually depend on a single battery for powering the vehicle. This limits the vehicles' range to only chemistries that can meet cycle life, durability, and range requirements, usually meaning that the chemistries have to be limited. Many chemistries can have higher energy densities than conventional chemistries used for electric vehicle batteries (e.g., two to three times higher in energy densities) but possess insufficient cycle life. Given that range extension is needed in electric vehicles, said chemistries, when managed properly, can be utilized for significantly extending the range outside conventional capabilities.

The illustrative embodiments recognize that most conventional cells in rechargeable batteries are connected in parallel, precluding controlling input and output currents passing through the cells. The illustrative embodiments also recognize that when individual cells of said rechargeable batteries fail, it is difficult to maintain the battery's integrity and performance, as the death of the cell is accelerated due to a failure to detect and/or mitigate said failure in time. Moreover, in some configurations, the entire battery may be rendered unusable when one cell fails. The illustrative embodiments further recognize that conventional batteries have not utilized high energy density chemistries due to high cycle life requirements.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of systems are used in the figures and the illustrative embodiments. In an actual computing environment, additional structures or components that are not shown or described herein or structures or components different from those shown but for a similar function as described herein may be present without departing the scope of the illustrative embodiments.

Furthermore, the illustrative embodiments are described concerning specific actual or hypothetical components only as examples. The steps described by the various illustrative embodiments can be adapted for power supply systems for electric vehicles using a variety of components that can be purposed or repurposed to provide a described operation, and such adaptations are contemplated within the scope of the illustrative embodiments.

The illustrative embodiments are described concerning certain types of steps, applications, processors, problems, and data processing environments only as examples. Any specific manifestations of these and other similar artifacts are not intended to be limiting to the invention. Any suitable manifestation of these and other similar artifacts can be selected within the illustrative embodiments' scope.

The examples in this disclosure are used only to clarify the description and are not limiting to the illustrative embodiments. Any advantages listed herein are only examples and are not intended to be limiting to the illustrative embodiments. Specific illustrative embodiments may realize additional or different advantages. Furthermore, a particular illustrative embodiment may have some, all, or none of the advantages listed above.

The illustrative embodiments described herein are directed to a power supply system 100 for electric vehicles. The power supply system 100 (FIG. 1) is configured to include low cycle life, high energy density chemistries in a hybrid architecture to enable the benefits of such chemistries, including significant increases in range while protecting said architecture from the liabilities of said chemistries that have prevented them from otherwise being relied upon in the automotive field. Battery systems disclosed herein may be referred to as "hybrid" systems since they include multiple chemistries working in tandem. Alternatively, to distinguish from "hybrid" vehicles that use both electric and internal combustion power sources, battery systems, vehicles, and related systems and components disclosed herein may be referred to as "range-extending, multi-chemistry battery systems."

A power supply system 100 as disclosed herein may include a traction battery 102 (including, for example, lithium iron phosphate (LFP)) and a hybrid range extender battery 124 comprising one or more high energy density hybrid modules 112 that possess one or more hybrid chemistries and that can be controlled to provide power to charge the traction battery 102 and/or power the electric vehicle. One or more embodiments recognize that an existing problem in rechargeable battery manufacturing needs to provide electric vehicles with batteries having high energy densities that increase the range of electric vehicles available long-distance driving beyond conventional ranges while accounting for corresponding low cycle life introduced by said high energy densities.

One or more embodiments includes one or more processors 106 (or processors 120, computer processors 206, FIG. 2) included in or outside an on-board or external computer system 126 (or computer system 200) to perform some of the steps herein. A traction battery may monitor and determines the limits of the discharge and charge. An inverter may manage a flow of power, and a hybrid module controller may manage its own charge/discharge via a DC/DC converter. In one or more embodiments, the vehicle 302 (FIG. 3) is configured as an electric vehicle (EV). In one or more embodiments, the vehicle 302 is configured as a plug-in hybrid electric vehicle (PHEV). The term electric vehicle is used hereinafter to collectively vehicles such as motor vehicles, railed vehicles, watercraft, and aircraft configured to utilize rechargeable electric batteries as their main source of energy to power their drive systems propulsion or that possess an all-electric drivetrain.

Further, as used herein, a sensor is a sensor device that can be a system, an apparatus, software, hardware, a set of executable instructions, an interface, a software application, a transducer, and/or various combinations of the aforementioned that include one or more sensors utilized to indicate, respond to, detect and/or measure a physical property and generate data concerning the physical property.

Further, battery energy density is used generally to refer to a measure of how much energy a cell contains in proportion to its volume.

Even further, as used herein, a high energy density module generally refers to a module having cells with a cell energy density of about 1000 Wh/L or more, for example, with an energy density of 1100 Wh/L or 1200 Wh/L. Persons of ordinary skill in the art will recognize, as shown in FIG. 4B that conventional battery chemistries with automotive levels of performance have cell energy densities, measured at a cell level, below or significantly below 1000 Wh/L, for example, between about 350 Wh/L and 500 Wh/L. Using high energy density chemistries in the hybrid range extender battery 124 may ensure the provision of energies, for example, more than twice or three times the energies provided by the traction battery 102.

In one or more embodiments, the power supply system 100 comprises a traction battery 102 having one or more traction modules 122, a hybrid range extender battery 124 comprising one or more high energy density hybrid modules 112, and a partition between the traction battery 102 and the hybrid range extender battery 124.

Each module can be a battery stack. Those having skill in the art appreciate that other types of battery devices can be used to provide power in the embodiments described herein, and, thus, the recitation of certain configurations is not intended to be limiting. As discussed herein concerning FIG. 1, a battery management system, BMS 104 may use, for example, an on-board computer system 126 to control the relays 108 and report operational limits. It may also request power from one or more hybrid modules to meet a need of the vehicle. The hybrid module controller of a hybrid range extender battery 124 may control its contribution to a high voltage DC bus based on its own internal goals (such as goals defined by one or more pre-set or dynamically-determined rules), energy state, and the observed energy state of the traction battery and driving behavior without centralized coordination from the BMS. Thus, the power supply system 100 can be operated in a more efficient and power-saving mode to increase the distance of operation of the vehicle 302 or prevent the degradation of a module caused by a single malfunctioning cell. For example, during a journey, one or more embodiments described herein include an on-board computer system 126 that will estimate the electrical power requirements to navigate to a destination and determine if the vehicle 302 can safely reach the destination using the stored energy available to operate. If the computer system 126 determines that the vehicle cannot reach the predetermined destination, the traction battery 102 may be charged using the hybrid range extender battery 124 to provide enough power for the journey.

In one or more embodiments, the high energy density hybrid modules 112 are configured to have a single chemistry, whereas in one or more other embodiments, the high energy density hybrid modules 112 are configured to have multiple chemistries (for example, three chemistries for daily, weekly and monthly use).

In an illustrative embodiment, the traction battery 102 comprises a single traction module 122 or a plurality of traction modules 122 connected in series. In another illustrative embodiment, the hybrid range extender battery 124 has a plurality of high energy density hybrid modules 112 connected in parallel with each other and also in parallel with the traction battery 102, allowing each of the high energy density hybrid modules 112 to manage their contribution to the charging of the traction battery 102 or powering of the vehicle 302, wherein a hybrid module controller 118 of each high energy density hybrid module 112 includes a bi-directional DC-DC converter. More generally, negative terminals are connected, and the positive output of bi-directional DC-DC converters are connected.

In one or more embodiments, the batteries that can be utilized in the hybrid range extender battery 124 described herein to provide power to vehicle 302 or charge the traction battery 102 include batteries having cells 114 with cell energy densities greater than 1000 Wh/L.

Battery systems in electric vehicles are typically traction batteries and are made up of hundreds of cells that are packed together. These systems, with a voltage rating of, for example, 300V to 400V, supply current as high as about 300A (e.g., 200-300A), and any mismanagement could trigger significant disaster. Battery management systems are thus essential in electric vehicles for the safe operation of high-voltage batteries. They can be configured to monitor the state of the batteries and prevent overcharging and discharging that may reduce the battery's life span, capacity and even cause explosions. For instance, a BMS checks the voltage, and when the required voltage is reached, it stops the charging process. When irregular patterns in the power flow are detected, a BMS can shut down the battery and send out an alarm. Moreover, BMSs can be configured to relay the information about the battery's condition to energy and power management systems. In addition, they can regulate the temperatures of the battery cells and also the battery's health, making it safe and reliable under all conditions.

One feature of a BMS is the ability to estimate the state-of-charge (SOC) of a battery pack as it is desirable or, in some cases, critical to efficiently maintain the SOC of the battery packs to ensure that the voltage of the battery is not too high or too low. For example, in some cases the battery should not be charged beyond 100 percent or discharged to 0 percent as this will reduce the capacity of the battery cells. A BMS may provide precise information on the voltage and temperature of the battery as well as providing an indication of the energy available for use and the remaining battery charge.

In some embodiments, a SOC may be estimated. Moreover, in a coulomb-counting process, the current going into or coming out of a battery is integrated to produce the relative value of its charge. However, it often may be difficult for conventional systems to accurately determine the SOC and other characteristics of individual cells connected in parallel.

Therefore, the illustrative embodiments recognize that conventional BMSs are not capable of accurately measuring the individual characteristics of cells in a battery pack. Conventional solutions attempt to obtain estimates but have no way of controlling a cell's current to measure corresponding characteristic parameters, such as voltage, of the cell.

Turning back to FIG. 1, the traction battery 102 may include one or more traction modules 122 configured to power the vehicle 302. The hybrid range extender battery 124 is designed to be modular, having one or more than one type of chemistry, different from the chemistry of the traction battery 102, to provide the vehicle with its varying power requirements when needed. As a specific example, the traction battery may have an LFP chemistry, and the hybrid range extender battery 124 may have a Gr (Graphite) or Gr+SS (Graphite+Solid State) chemistry. Regardless of the specific chemistry used, the hybrid range extender battery 124 may be designed to have one or a plurality of high energy density hybrid modules 112 or packs that are configured with respective DC-DC converters to act as stand-alone batteries. By being able to independently control the high energy density hybrid modules 112, and independently measure the health or state of its individual cells 114, a charging and discharge rate the cells 114 can be regulated. In an embodiment, cells 114 of the high energy density hybrid modules 112 are arranged in series. By using a balance device 128 such as a bleeder resistor connected in parallel with each cell 114, a rate of charging or discharging of the cell 114 can be controlled, i.e., Turning on the bleeder resistor for a cell discharges the electric charge stored in the cell. In an illustrative embodiment, The bleeder resistor may be enabled to create an additional discharge current of up to a few hundred (200) milliamps, thereby minutely adjusting the charge/discharge current of a cell and allowing the cells within the string to be brought to a common state. Further, one or more sensors 116 are used to measure voltages and determine how long the bleeder resistor should remain activated to achieve a balanced state across all cells in the series string of cells.

The rate at which a battery is discharged relative to its maximum capacity is its C-rate. For example, a 1C rate means that the discharge current will discharge the entire battery in 1 hour. Typically, a vehicle needs 4C peak and 1C average. By controlling the high energy density hybrid modules 112 individually with the bi-directional DC-DC converters, a rate of C/5 (i.e., 0.2C) or less can be achieved. This prevents triggering failure events associated with high energy density chemistries due to excessive charging and discharging. More specifically, a traction battery 102 may follow the load demand of the vehicle and provide the peak currents. The high energy density hybrid modules 112 may employ their bi-directional DC-DC converters to discharge into the vehicle HV bus where the traction battery and powertrain are connected. In an illustrative embodiment that has five high energy density hybrid modules 112, each contributing C/5, then their combined contribution is 1C. If the vehicle needs 4C, the traction is discharged at 3C. If the vehicle needs 1C, the traction battery 102 is at rest (0C). If the vehicle needs −1C (regenerative braking), the traction battery is recharged at a 2C. In an embodiment, each high energy density hybrid module 112 also has an operatively coupled hybrid module controller 118 for measuring the health or state of the cells 114. For example, a hybrid module controller 118 can be configured to measure the voltage, current, temperature, SOC (State of Charge), SOH (State of Health) for all cells of the corresponding high energy density hybrid module 112. It also has a DC-DC converter control to allow isolation and current to be managed and throttle their contribution, both absorbing and providing energy to the main bus/high voltage DC bus of the power supply system 100. The system also may have a BMS 104 configured to primarily communicate with the traction battery 102. In case a traction battery 102 malfunctions, one or more of the high energy density hybrid module 112 can act as a replacement (e.g., temporary replacement) for the traction battery 102 by supplying power directly to the drive unit 110. One or more processors (processor 120, processor 106, or a processor of computer system 126) are used in a number of configurations to enable the performance of one or more processes or operations described herein. Relays 108 are controlled to operatively couple a drive unit 110 of the vehicle to power from the power supply system 100. The drive unit 110 may collectively refer to devices outside the power supply system 100 such as a propulsion motor, inverter, HVAC (Heating, Ventilation, and Air Conditioning) system, etc.

Figure 2:
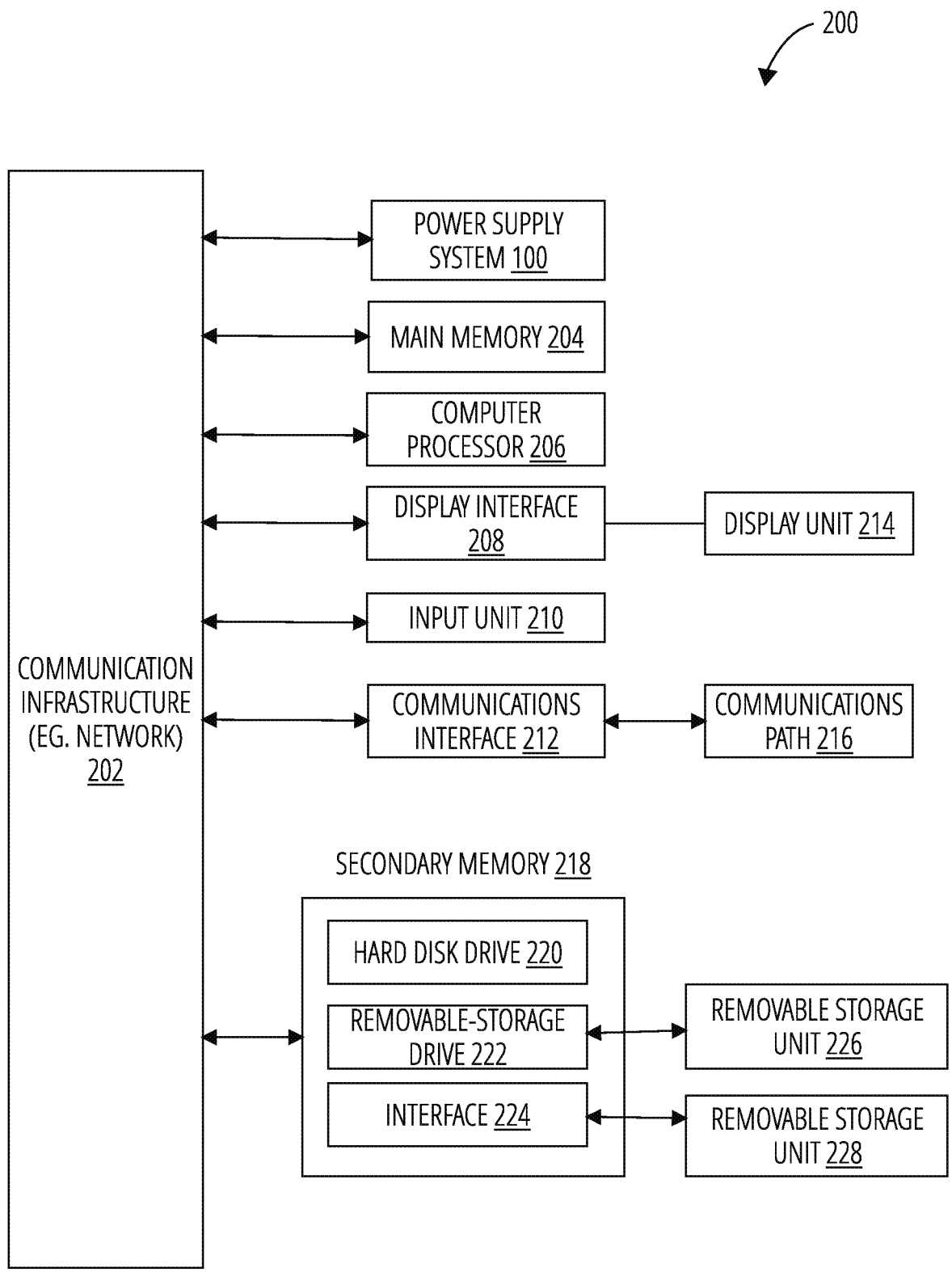
FIG. 2 depicts a block diagram of a computer system in which illustrative embodiments may be implemented.
Figure 3:
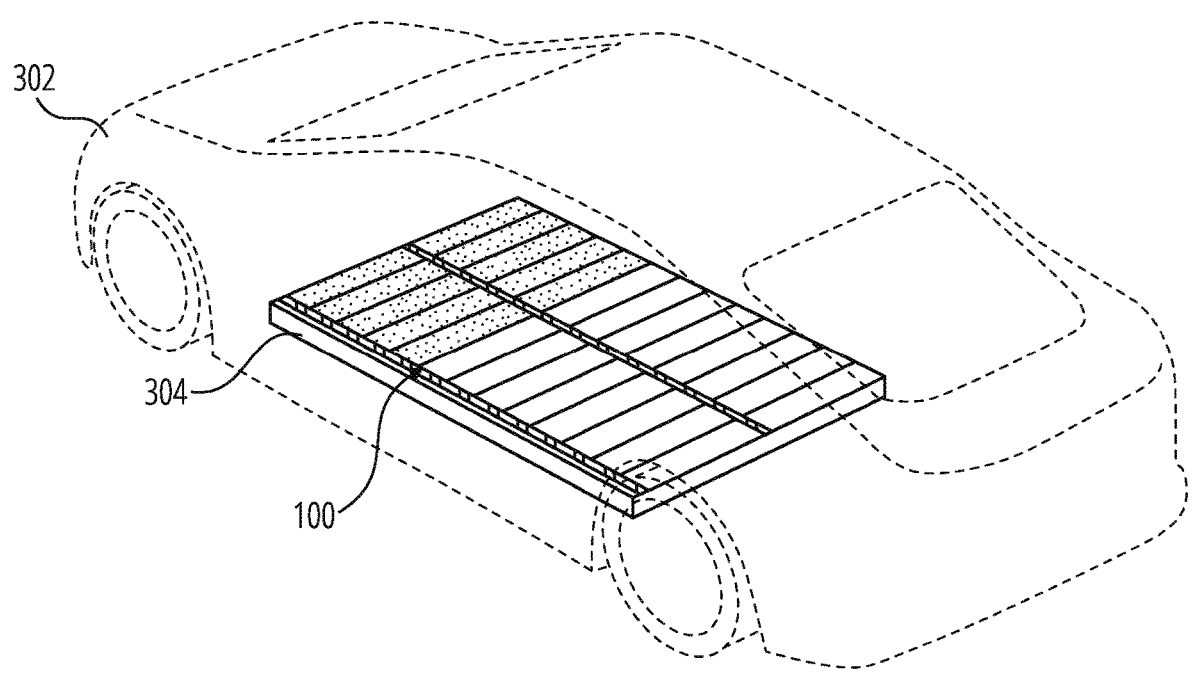
FIG. 3 depicts a sketch of an electric vehicle in accordance with an illustrative embodiment.

Having described the power supply system 100, reference will now be made to FIG. 2, which shows a block diagram of a computer system 200 that may be employed in accordance with at least some of the illustrative embodiments herein. Although various embodiments may be described herein in terms of this exemplary computer system 200, after reading this description, it may become apparent to a person skilled in the relevant art(s) how to implement the disclosure using other computer systems and/or architectures.

In an example embodiment herein, the computer system 200 forms a part or is independent of computer system 126 of FIG. 1. Moreover, at least some components of the power supply system 100 may form or be included in the computer system 200 of FIG. 2. The computer system 200 includes at least one computer processor 206. Processor 106 and processor 120 of the power supply system 100 may be or form part of a computer processor 206 or may be independent of a computer processor 206. The computer processor 206 may include, for example, a central processing unit (CPU), multiple processing units, an application-specific integrated circuit ("ASIC"), a field-programmable gate array ("FPGA"), or the like. The computer processor 206 may be connected to a communication infrastructure (e.g., Network) 202 (e.g., a communications bus, a network). In an illustrative embodiment herein, the computer processor 206 includes a CPU that controls a process of operating the power supply system 100 including controlling states of bi-directional DC-DC converters between high energy density hybrid modules 112 and the traction battery 102 or drive unit 110 of the electric vehicle 302.

The display interface 208 (or other output interfaces) may forward text, video graphics, and other data about the power supply system 100 from the communication infrastructure (e.g., Network) 202 or from a frame buffer (not shown) for display on display unit 214 which may be a display of the electric vehicle 302. For example, the display interface 208 may include a video card with a graphics processing unit or may provide an operator with an interface for controlling the power supply system 100.

The computer system 200 may also include an input unit 210 that may be used, along with the display unit 214 by an operator of the computer system 200 to send information to the computer processor 206. The input unit 210 may include a keyboard and/or touchscreen monitor. In one example, the display unit 214, the input unit 210, and the computer processor 206 may collectively form a user interface.

One or more computer-implemented steps of operating the power supply system 100 may be stored on a non-transitory storage device in the form of computer-readable program instructions. To execute a procedure, the computer processor 206 loads the appropriate instructions, as stored on the storage device, into memory and then executes the loaded instructions.

The computer system 200 may further comprise a main memory 204, which may be random-access memory ("RAM"), and also may include a secondary memory 218. The secondary memory 218 may include, for example, a hard disk drive 220 and/or a removable-storage drive 222 (e.g., a floppy disk drive, a magnetic tape drive, an optical disk drive, a flash memory drive, and the like). The removable-storage drive 222 reads from and/or writes to a removable storage unit 226 in a well-known manner. The removable storage unit 226 may be, for example, a floppy disk, a magnetic tape, an optical disk, a flash memory device, and the like, which may be written to and read from by the removable-storage drive 222. The removable storage unit 226 may include a non-transitory computer-readable storage medium storing computer-executable software instructions and/or data.

In further illustrative embodiments, the secondary memory 218 may include other computer-readable media storing computer-executable programs or other instructions to be loaded into the computer system 200. Such devices may include a removable storage unit 228 and an interface 224 (e.g., a program cartridge and a cartridge interface); a removable memory chip (e.g., an erasable programmable read-only memory ("EPROM") or a programmable read-only memory ("PROM")) and an associated memory socket; and other removable storage units 228 and interfaces 224 that allow software and data to be transferred from the removable storage unit 228 to other parts of the computer system 200.

The computer system 200 may also include a communications interface 212 that enables software and data to be transferred between the computer system 200 and external devices. Such an interface may include a modem, a network interface (e.g., an Ethernet card or an IEEE 802.11 wireless LAN interface), a communications port (e.g., a USB or FireWire® port), a Personal Computer Memory Card International Association ("PCMCIA") interface, Bluetooth®, and the like. Software and data transferred via the communications interface 212 may be in the form of signals, which may be electronic, electromagnetic, optical, or another type of signal that may be capable of being transmitted and/or received by the communications interface 212. Signals may be provided to the communications interface 212 via a communications path 216 (e.g., a channel). The communications path 216 carries signals and may be implemented using wire or cable, fiber optics, a telephone line, a cellular link, a radio frequency ("RF") link, or the like. The communications interface 212 may be used to transfer software or data or other information between the computer system 200 and a remote server or cloud-based storage (not shown).

One or more computer programs or computer control logic may be stored in the main memory 204 and/or the secondary memory 218. The computer programs may also be received via the communications interface 212. The computer programs include computer-executable instructions which, when executed by the computer processor 206, cause the computer system 200 to perform the methods as described hereinafter. Accordingly, the computer programs may control the computer system 200 and other components of the power supply system 100.

In another embodiment, the software may be stored in a non-transitory computer-readable storage medium and loaded into the main memory 204 and/or the secondary memory 218 using the removable-storage drive 222, hard disk drive 220, and/or the communications interface 212. Control logic (software), when executed by the computer processor 206, causes the computer system 200, and more generally the power supply system 100, to perform some or all of the methods described herein.

Lastly, in another example, embodiment hardware components such as ASICs, FPGAs, and the like, may be used to carry out the functionality described herein. Implementation of such a hardware arrangement so as to perform the functions described herein will be apparent to persons skilled in the relevant art(s) in view of this description.

Figure 4A:
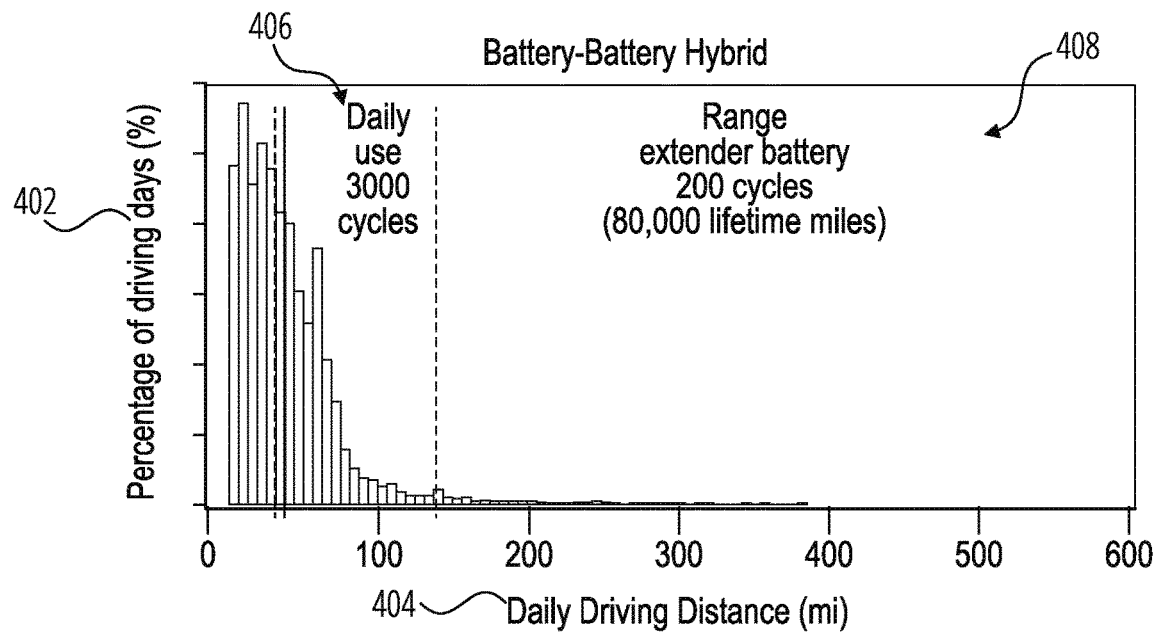
FIG. 4A depicts a chart in accordance with an illustrative embodiment.
Figure 4B:
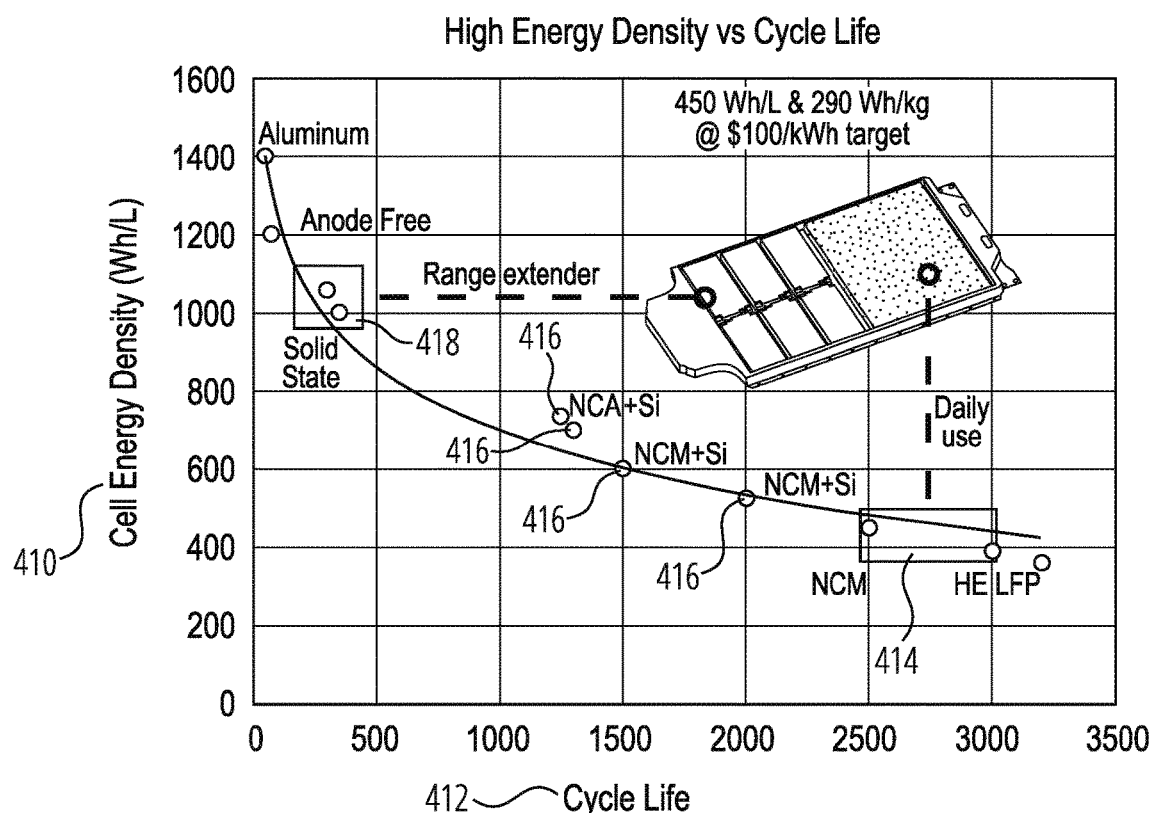
FIG. 4B depicts another chart in accordance with an illustrative embodiment.

FIG. 4A shows a chart according to an illustrative embodiment. The chart shows a percentage of driving days axis 402 and a daily driving distance axis 404 for an example embodiment as disclosed herein. By measuring the driving habits of a user, it can be seen that a significant percentage of days spent driving are spent driving relatively short distances and thus utilizing the traction battery 102 as shown by a traction battery portion 406 of the chart. On the other hand, the hybrid range extender portion 408 is used for a comparatively much shorter amount of time. It happens then that, as shown in FIG. 4B, a range extender with a chemistry that provides an energy density of 1000 Wh/L or more may provide a good trade-off of density vs. cycle life. By determining the percentage of cycles that fall outside daily use and selecting the appropriate chemistry that can sustain that many cycles, the illustrative embodiment of FIG. 4A can be achieved.

The chart of FIG. 4B includes an energy density axis 410 and a cycle life axis 412. As used herein, the "cycle life" of a battery refers to the number of times the battery may be depleted to 100% depth of discharge (DoD) while still holding at least 80% of its original charge. So, for example, a battery having a cycle life of 100 cycles would hold 80% of its original charge after being charged and completely depleted 100 times[1].

A traction battery chemistry may be selected from a traction battery chemistry area 414 to provide a cycle life of about 3000 cycles (for example, at least 2500 or 3000 cycles). In conventional battery chemistries, this cycle life typically provides a corresponding cell energy density of about 400 Wh/L. To accommodate a predetermined range requirement for non-traction applications, a range battery chemistry may be selected from an illustrative hybrid range extender battery chemistry area 418 (for example, between 1000 and 1200 Wh/L). This typically provides a corresponding cycle life of about 200 cycles (for example, between 200 and 350 cycles) or less. Depending on the energy requirements of a vehicle, other chemistries 416 can be optionally utilized for medium-range requirements and corresponding packs controlled independently.

More generally, embodiments disclosed herein may use multiple battery chemistries in a power supply system, each of which may have different expected cycle lives and/or cell energy densities. This may allow use of battery chemistries and arrangements that conventionally are considered unsuitable for electric vehicles and similar devices. For example, conventional systems have often presumed that a higher cycle life is necessary, even at the expense of higher energy density. In contrast, embodiments disclosed herein can make use of higher-density chemistries even where the associated battery may have a relatively low cycle life, since the range extender or intermediate-range battery cells may not be put through charge/discharge cycles as often as the regular-use traction battery.

As a specific example, a hybrid power supply system as disclosed herein may include a traction battery having a cell energy density of not more than about 500 Wh/L, 450 Wh/L, 400 Wh/L, 350 Wh/L, 300 Wh/L, or less, more generally in the range of 300-500 Wh/L, but a relatively high cycle life of 2000 cycles, 2500 cycles, 3000 cycles, or more, more generally in the range of 2000-3200 cycles.

A higher-density battery cell used for a range extender battery or an intermediate battery as disclosed herein may have a relatively higher cell energy density of 800 Wh/L, 1000 Wh/L, 1100 Wh/L, 1200 Wh/L, or more, or in the range 800-1400 Wh/L, and a relatively lower expected cycle life of 300, 400, or 500 cycles or less, or in the range of 100-500 cycles or less. Other battery types and chemistries may be used, especially in embodiments that use more than two chemistries. For example, any of the battery types shown between the traction area 414 and the range extender area 418 in FIG. 4B may be used for an intermediate density battery, which may have a cycle life in the range of 1000-2000 cycles and an energy density in the range 500-800 Wh/L.

A figure of interest for battery chemistries used with embodiments disclosed herein is the energy density per cycle (EDC), determined as the ratio of the cell energy density of the battery to the expected cycle life. For example, as shown in FIG. 4B, an HE traction battery may have a cell energy density of about 400 Wh/L and a cycle life of 3000 cycles, resulting in an EDC of about 0.13 Wh/L/cycle. In contrast, a solid state battery in the range extender area 418 of FIG. 4B may have an energy density of about 1000 Wh/L and a cycle life of about 400 cycles, resulting in an EDC of about 2.5 Wh/L/cycle. Conventional battery chemistries having an EDC of 1.0 or more have previously been considered unsuitable for use in electric vehicles due to the relatively low cycle life. As previously disclosed, embodiments provided herein allow for such batteries to be used efficiently in electric vehicles when used in tandem with other chemistries.

As a specific example, embodiments disclosed herein may use a traction battery having an EDC of about 0.12-0.16 Wh/L/cycle and a range extender battery having an EDC of 1.0 or more, 2.0 or more, 5.0 or more, or any intervening value. Other chemistries may be used as well; for example, where three chemistries are used, the traction battery may have an EDC of 0.12-0.16 Wh/L/cycle and other batteries in the system may have an EDC between that of the traction battery and a highest-density battery, with the highest-density battery having an EDC of 1 Wh/L/cycle or more.

More generally, any number of battery chemistries may be used in tandem, with a "daily" traction battery having a lower EDC and more special-use battery chemistries having higher EDC values. As another example, a single battery chemistry in the daily use traction area 414 may be used in conjunction with any number of batteries in the range extender region 418, and/or any number of batteries in any intermediate range shown in FIG. 4B. For example, a third battery chemistry may be used in conjunction with the traction and range extender batteries previously disclosed, with the third chemistry having a cell energy density from 400 to 1200, 1300, or 1400 Wh/L or more.

Figure 5A:
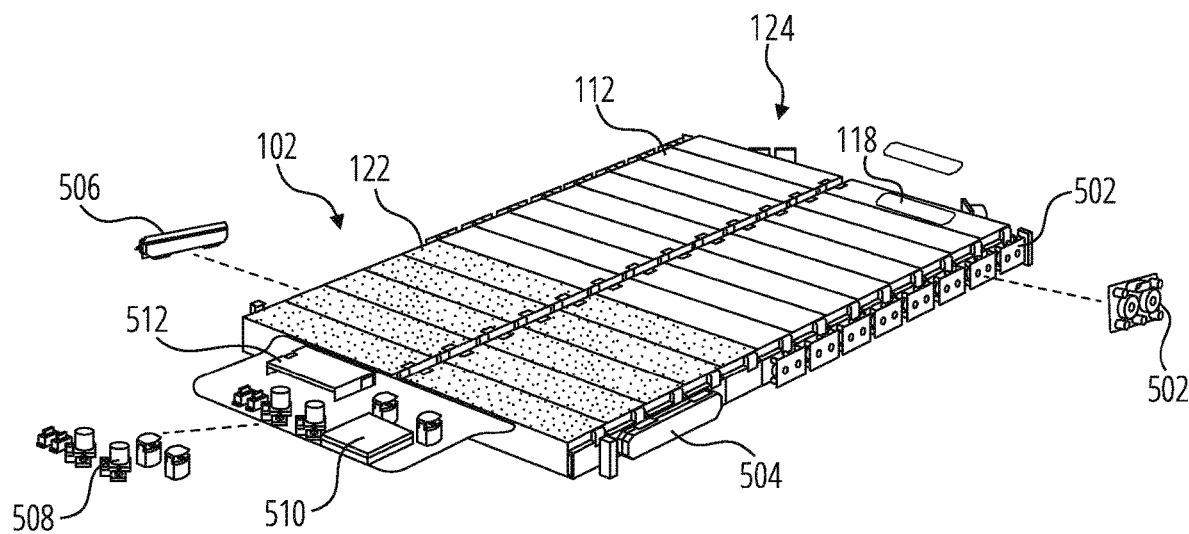
FIG. 5A depicts a sketch of a power supply system in accordance with an illustrative embodiment.

FIG. 5A shows an illustrative embodiment of a power supply system 100. The system includes a traction battery 102, a plurality of high energy density hybrid modules 112 connected in parallel to a main traction bus/high voltage DC bus, a plurality of traction modules 122, a plurality of bi-directional DC-DC converter 502. In addition, it has an on-board AC-DC charger 504 for recharging the power system from the grid, a 12 V battery 512 for powering lights and ignition of the vehicle, an auxiliary DC-DC converter 506 for maintaining the 12 V battery 512 and providing power to the 12V systems of the vehicle. The embodiment also has contactors 508 for switching various circuits on or off and a control module 510 for controlling the power supply. By placing the 12 V battery 512 within the power supply system (inside the traction battery 102) instead of outside as is done in conventional systems, the contactors 508 can be controlled, for example, kept closed, even if there are other momentary issues with the 12V system. In an illustrative embodiment, a momentary (for example, about 100 ms or more) loss of battery power could cause the contactors to open. This loss could be caused by a single bad wire external to the battery pack. By bringing the 12V inside the pack, this risk may be reduced.

In an embodiment such as shown in FIG. 5A, each high energy density hybrid module 112 has about 56 cells 114 connected in series. The specific number of cells is illustrative, and other numbers of cells may be used without departing from the scope of the present disclosure. An operatively coupled hybrid module controller 118, such as an on-board hybrid module controller 118, is configured to measure the voltage, current, temperature, SOC, and SOH of each of the individual cells 114. Each of the 56 cells 114 may have an associated voltage sensor 116. Knowing the current passing through the cell 114 and temperature (such as the temperature of various points on the high energy density hybrid module 112), the SOH, SOC, and other parameters for the cells 114 can be calculated to determine whether the energy output of the corresponding high energy density hybrid module 112 can be connected to the traction battery 102 or in some cases the drive unit 110 through a corresponding bi-directional DC-DC converter 502. Moreover, a bi-directional DC-DC converter 502 for each high energy density hybrid module 112 can be used to precisely control the current input and output for each high energy density hybrid module 112, unlike in load following conventional power supplies, which have no control over changing drive power. In an illustrative embodiment, charge and discharge pulses are generated for the high energy density hybrid modules 112. By controlling the amount of current for the series-connected cells 114 of the high energy density hybrid module 112 through the use of a bi-directional DC-DC converter 502 and measuring the voltages of each of the cells 114, the impedances of each of the cells 114 can be computed and compared to reference data, to identify any unwanted deviations in a cell impedance and a corresponding change in the health of the cell.

Current input for each high energy density hybrid module 112 may come from the charger after the traction battery is charged or mostly charged. For maintenance and/or diagnostic purposes, a hybrid module might be discharged and recharged when not strictly needed as a range extender. For example, if it has been several months since a hybrid module has been used as a range extender, it might be discharged and recharged during normal daily use to exercise the cells. How often the range extender battery is discharged and recharged outside of normal use, or even whether to perform such discharging/charging may be selected based upon the particular chemistry or chemistries used in the range extender battery.

The hybrid module controller 118 also may manage the strain of the cells 114 by monitoring and bringing them into alignment. For example, when one cell 114 (Cell A) is determined to be at a lower SOC (e.g., 20%) than another cell 114 (Cell B) that is connected in series (70%), Cell B will reach a full charge earlier than Cell A, thus requiring the charging of Cell B to be halted to prevent overcharging it. By reducing the SOC of Cell B to that of Cell A using a bleeder resistor, Cell A and Cell B can both be charged at the same rate to a predetermined full charge. Thus, the hybrid module controller 118 keeps the SOC of the 56 cells 114 equal or substantially equal (e.g., within +/−10%, or +/−5%, or +/−1%,) such that a full range of the module can be used. In another example, by determining cells 114 with lower self-discharge rates than that of other cells 114, the hybrid module controller 118 determines which cells 114 to selectively discharge to a determined charge in order to subsequently charge all 56 cells 114.

In another illustrative embodiment, because the high energy density hybrid modules 112 are connected in parallel to each other and independently controlled, an individual high energy density hybrid module 112 may be separately removable for reconditioning by slowing charging and discharging it without affecting the normal operation of the power supply system 100.

Figure 5B:
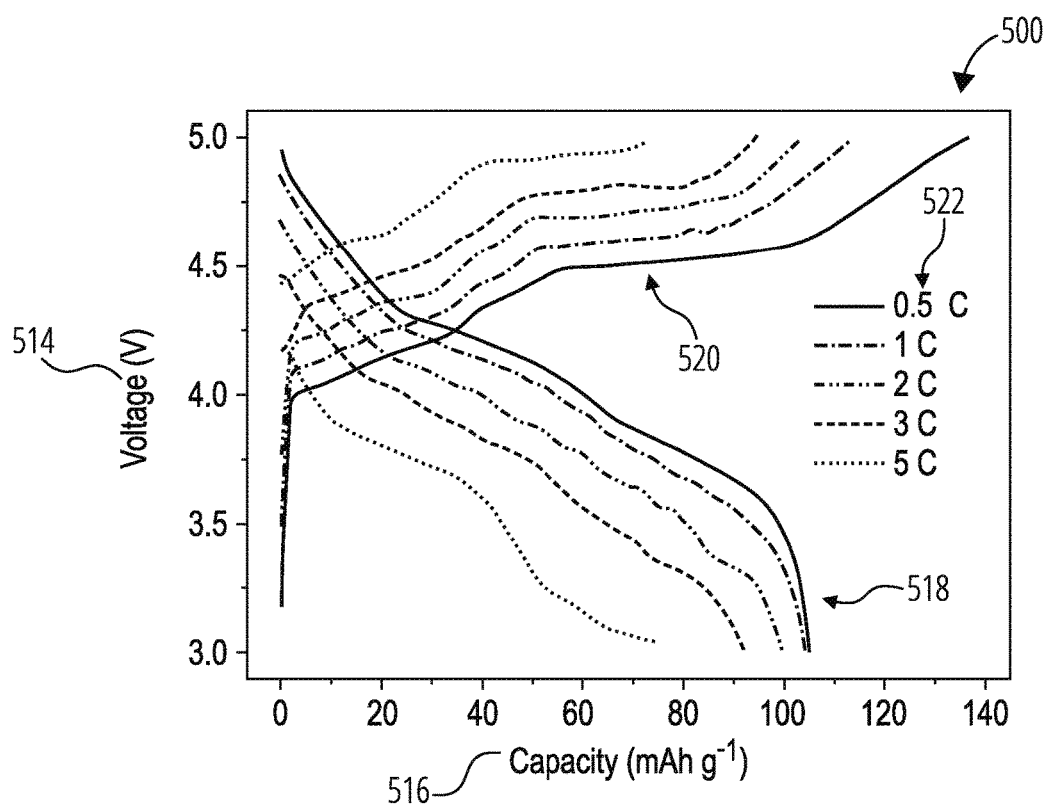
FIG. 5B depicts a chart of a chart discharge curve in accordance with an illustrative embodiment.

FIG. 5B illustrates an example charge-discharge curve 500 of a cell which includes a voltage axis 514, a capacity axis 516, discharge curves 518, and charge curves 520. As illustrated in the discharge curves 518, at high discharge currents/C-rate 522 rate (e.g., 5C), the cell capacity is not fully utilized, and the cell voltage drops due to internal resistance. Current flowing through a cell causes an IR voltage drop across an internal resistance of the cell, which decreases the terminal voltage of the cell during discharge and increases the voltage needed to charge the cell, thus reducing its effective capacity as well as decreasing its charge/discharge efficiency. Higher discharge rates give rise to higher internal voltage drops, which explains the lower voltage discharge curves at high C-rates 522 and characteristically different shapes of the curves. By discharging and charging at the various C-rates 522, due to an ability to control currents precisely using the bi-directional DC-DC converters 502, any cell's impedance problem can be deduced and mitigated by comparing it to a reference profile such as a previously stored profile the cell 114. This can be achieved using a controlled step response to characterize the behavior of cell 114 with time. One mitigation operation includes discharging high energy density hybrid modules 112 having no identified cell issues first. Another mitigation operation includes slowing down a discharge of a high energy density hybrid module 112 with an identified cell impedance issue.

Figure 6:
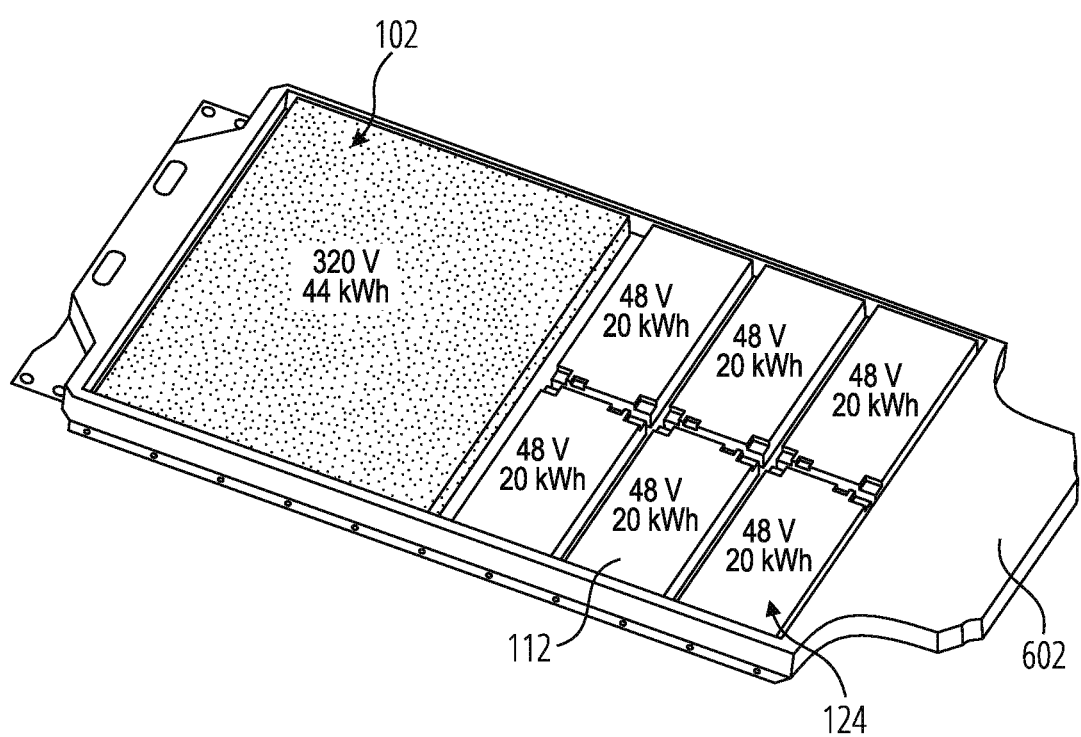
FIG. 6 depicts another sketch of a power supply system in accordance with an illustrative embodiment.

FIG. 6 shows another example configuration of a power supply system 100 as disclosed herein, which includes an on-board energy management system 602. In this example the traction battery 102 has a capacity of 44 kWh and provides a voltage of 320V, and a hybrid range extender battery 124 has a capacity of 120 kWh through six 20 kWh high energy density hybrid modules 112, each having a voltage of 48V. The on-board energy management system 602 has a battery management system (not shown) and is configured as a tri-voltage system to handle the 12V, 48V, and 320V. Moreover, the on-board energy management system 602 provides six bi-directional DC-DC converters (not shown), with each one operatively coupled to a high energy density hybrid module 112. By configuring the bi-directional DC-DC converters to provide a power of, for example, 10 kW, the energy management system 602 can provide 60 KW (6×10 kW) bi-directional 48-500 V DC-DC with a 98.5% peak efficiency. Of course, the particular arrangement of voltage, power capacity, and other features is non-limiting, and other configurations can be obtained in light of this specification. The examples in this disclosure are used only for the clarity of the description and are not limiting to the illustrative embodiments. Additional operations, actions, tasks, activities, and manipulations will be conceivable from this disclosure, and the same are contemplated within the scope of the illustrative embodiments.

Figure 7:
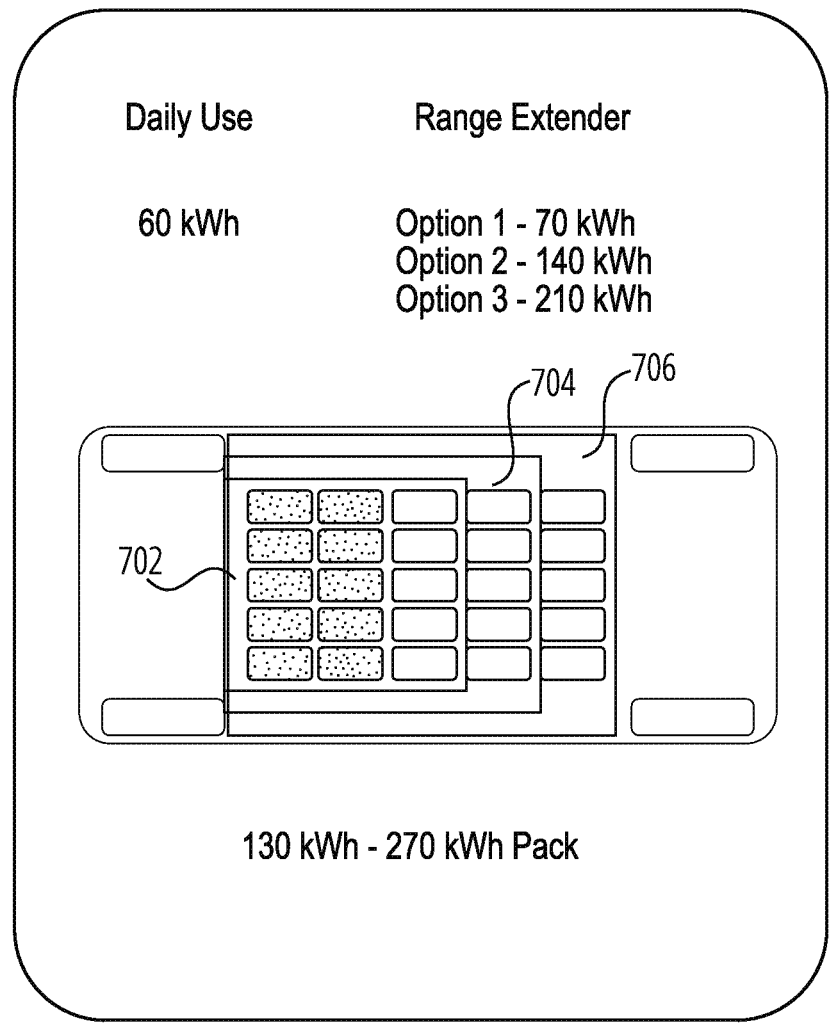
FIG. 7 depicts another block diagram of a power supply system and vehicle chassis in accordance with an illustrative embodiment.

Conventional battery capacities of current electric vehicles range from a mere 17.6 kWh in some smart cars with a range of just 58 miles, up to 100 kWh in some Tesla models (Tesla is a trademark of Tesla, Inc. in the United States and in other countries). By introducing a scalable architecture, as shown in FIG. 7, various configurations can be provided to meet different range requirements. In the illustrative embodiment of FIG. 7, by providing five additional high energy density hybrid modules 112 in configuration 2 704 than in configuration 1 702, available capacity is increased from 130 kWh to 200 kWh, and by introducing another five additional high energy density hybrid modules 112, to configuration 2 704, a 270 kWh capacity is obtained for configuration 3 706. Moreover, the scalable architecture allows an unrestricted placement of individual modules at different locations in a vehicle, outside a conventional placement on a chassis 304 (FIG. 3) of a vehicle 302, since each module only needs to be individually connected to the traction battery or a high voltage DC bus. As disclosed herein, for example with respect to FIG. 4, various high energy density modules may use different chemistries, allowing for additional flexibility in use cases, energy density and expected cycle life, and the like.

Figure 8:
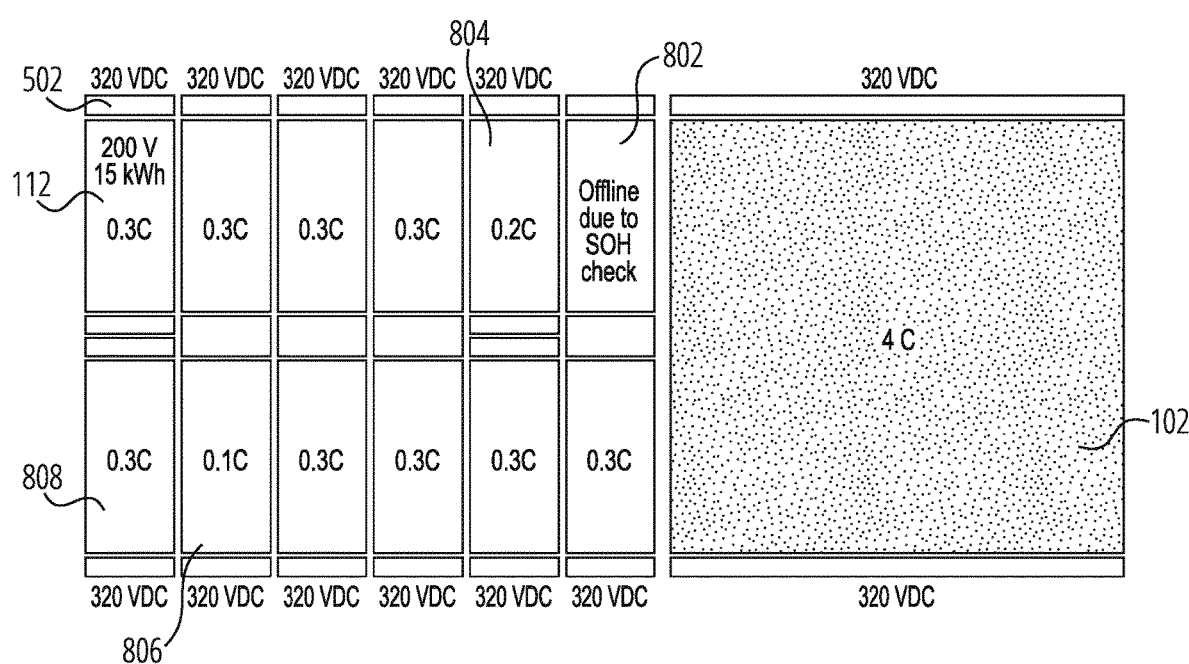
FIG. 8 depicts a block diagram of a power supply system in accordance with an illustrative embodiment.
Figure 9:
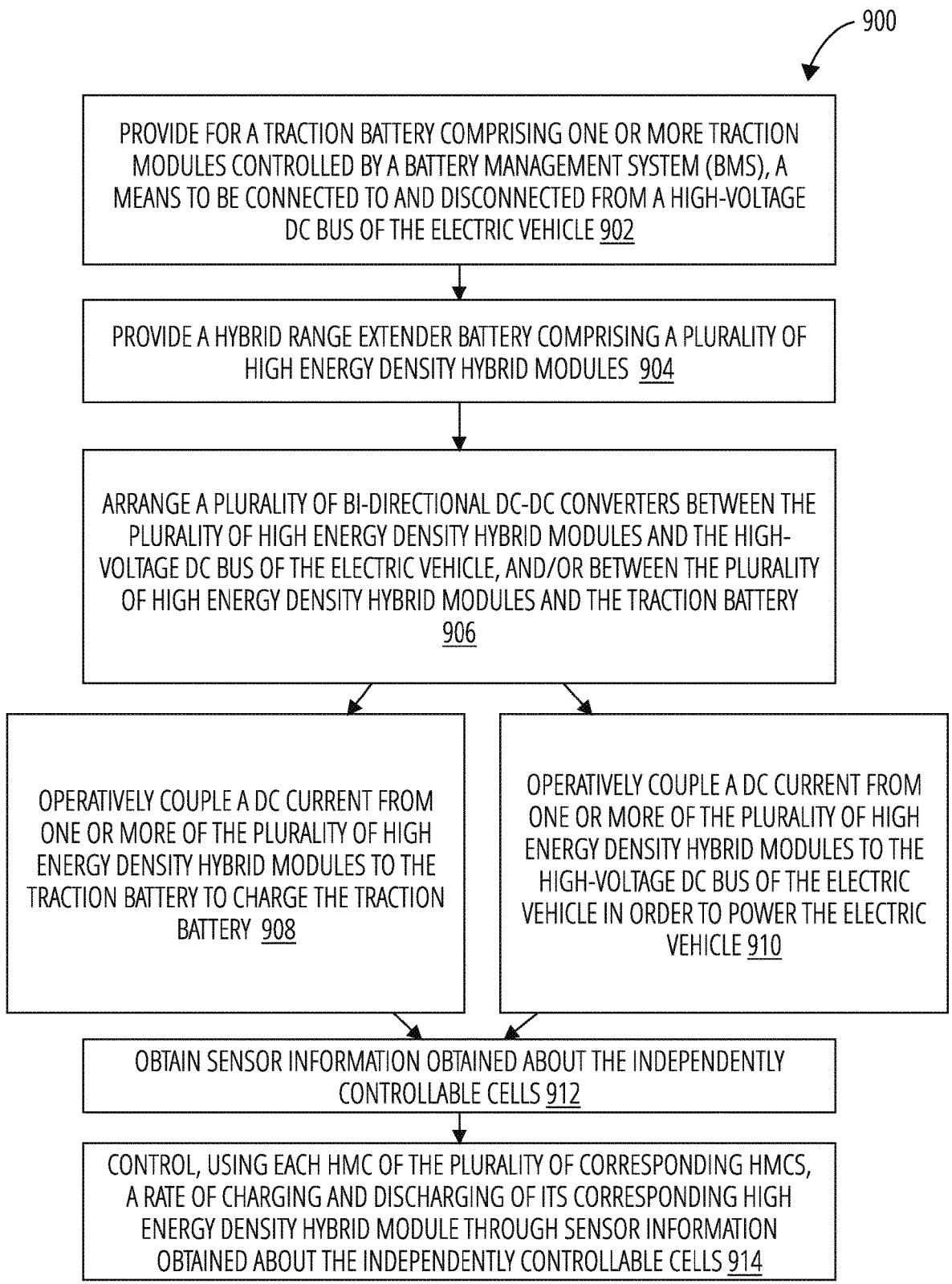
FIG. 9 depicts a flowchart of an example process for operating a power supply system in which illustrative embodiments may be implemented.

FIG. 8 shows another configuration of the power supply system having a traction battery 102, a plurality of high energy density hybrid modules 112, and a plurality of bi-directional DC-DC converters 502. In the configuration, a module is disabled due to a SOH check indicating an issue with a cell 114. The disabled hybrid module 802 is taken offline and may undergo a formation recharge to extend its life wherein the module is slowly discharged over, for example, a 20 hour period and slowly recharged over, for example, another 20 hour period, at a defined temperature, in order to rebuild its chemistry. The modular nature of the configuration provides that the vehicle is still usable during the formation recharge without a need to physically remove the disabled hybrid module 802. In an example herein, bleeder resistors of the cells 114 are used in the charging and discharging operations.

The figure also shows a reduced capacity hybrid module A 804, a reduced capacity hybrid module B 806, and a regular capacity hybrid module 808. The hybrid module controller 118 of reduced capacity hybrid module A 804 or of reduced capacity hybrid module B 806 is configured to detect an issue with a cell 114 and independently make a decision on its discharge rate, for example, by reducing a power output from 2 kW to 1Kw.

In step 902, process 900 provides for a traction battery comprising one or more traction modules controlled by a Battery Management System (BMS) to be connected to and disconnected from a high-voltage DC bus of an electric vehicle 302. Herein, the traction battery is configured to power the electric vehicle 302. In step 904, process 900 provides a hybrid range extender battery 124 comprising a plurality of high energy density hybrid modules 112 connected in parallel with each other and to the high voltage DC bus to which the traction battery 102 is also connected. Each high energy density hybrid module 112 of the plurality of high energy density hybrid modules 112 includes a corresponding hybrid module controller (HMC) and a plurality of cells 114 connected in series. The health of each cell 114 of the plurality of cells 114 is configured to be independently measurable by the corresponding HMC. A SOC of each cell can also be controlled through a balance device 128, such as a bleeder resistor connected in parallel with cell 114. The cells of each module can thus be controlled independently and as a whole.

In step 906, a plurality of bi-directional DC-DC converters 502 are arranged between the plurality of high energy density hybrid modules 112 and the high-voltage DC bus of the electric vehicle 302, and/or between the plurality of high energy density hybrid modules 112 and the traction battery 102.

Process 900 operatively couples a Direct Current from one or more of the plurality of high energy density hybrid modules 112 to the traction battery 102 (step 908) and/or to the high-voltage DC bus of the electric vehicle 302 (step 910) to charge the traction battery and/or power the electric vehicle 302 respectively. In step 912, process 900 controls a power generating mode of the power supply system by obtaining sensor information about the independently measurable cells 114. In step 914, process 900 controls, using each HMC of the plurality of the corresponding HMCs, a rate of charging and discharging of its corresponding high energy density hybrid module through sensor information obtained about the independently controllable cells.

Intelligent Power Control

The illustrative embodiments further recognize that traditional electric vehicle power systems that are configured to estimate a state of health (SOH) or state of charge (SOC) of component batteries are mostly reactive, incapable of predicting energy consumption needs and restricted to making use of remaining available energy in a largely retrospective manner. The illustrative embodiments recognize that while estimates can be presently obtained according to the perceived states of interest, little to no mitigation measures are available to ensure batteries' safety or preserve their available life and capacities. Moreover, the load following nature of conventional electric vehicle power computer systems, which have no control over changing drive power, means that the current input and output for battery modules cannot be precisely controlled.

As far as managing the chemistries of individual modules of a power supply system, existing conventional batteries charge and discharge all individual modules together. However, embodiments disclosed herein recognize that monitoring the chemistries of individual battery modules in a larger power supply system and controlling them individually to ensure the safety of the system as a whole may provide additional benefits not available in conventional battery systems and electric vehicles. For example, by being unable to disable individual modules for a formation recharge without the need to disable the larger power supply system in a conventional system, the safety of the power supply system cannot be guaranteed, and the available life cycles of individual modules are unduly shortened from overcharging and over-discharging.

Embodiments disclosed herein recognize that presently available tools or solutions do not address the need to provide intelligent management of individual modules in a hybrid architecture to provide additional power when needed while preserving or maximizing battery life cycles and thus the lifetime, safety, and maximum capacity of the individual modules in a manner that allows the achievement of range and distance goals. The illustrative embodiments used to describe the invention may address and solve the above-described problems and other related problems by the intelligent supply of power to an electric vehicle through high energy density hybrid modules 112 in a power supply system. The illustrative embodiments may solve these problems in a proactive and/or preparatory process that anticipates the power demands of electric vehicles and operates to meet said demands.

Certain operations are described as occurring at a certain component or location in an embodiment. Such locality of operations is not intended to be limiting on the illustrative embodiments. Any operation described herein as occurring at or performed by a particular component, e.g., a predictive analysis of battery data and/or a natural language processing (NLP) analysis of contextual calendar data, can be implemented in such a manner that one component-specific function causes an operation to occur or be performed at another component, e.g., at a local or remote machine learning (ML) or NLP engine respectively.

An embodiment monitors and manages the cumulative energy of hybrid power supply systems. Another embodiment monitors a variety of profile sources configured for the user. A profile source is an electronic data source from which information used to determine a user's profile characteristic can be obtained. For example, a profile source may be user's preferences configuration on a computing device such as a required speed or route, a calendar application where the user's future events are planned, and past events are recorded, a destination in a global positioning system (GPS) application where the user enters a current destination, feedback from a user or community and the like. A profile source can be a device, apparatus, software, or a platform that provides information from which a driving characteristic of the user can be derived. For example, an electric vehicle dashboard can operate as a profile source within the illustrative embodiments' scope. Moreover, a community such as a fleet of electric vehicles can be a profile source wherein a plurality of driving characteristics of user-profiles may be obtained to derive a preference, liking, sentiment, or usage of electric vehicles. Further, measured health metrics or parameters about individual modules of battery packs of the fleet of vehicles may be a profile source from the community and may be utilized to learn from and derive patterns for delivering power in a subject electric vehicle. Thus, batteries from a fleet of vehicles may adapt their predictions and share values for prediction/proposal purposes.

A user's profile data, information, and preference are terms that are used herein interchangeably to indicate a constraint of one or more users that affects the delivery of power in the power supply system. Furthermore, information/data about the electric vehicle and power supply system 100 (such as vehicle speed, module current, temperature, voltage, impedance, state of health, state of charge, average energy consumption, and the like or otherwise subject electric vehicle parameters 1220) may form part of or be separate from the constraints and may be obtained for use as input to an intelligent power control module for predictive analytics as described hereinafter. Thus, the profile source information and the electric vehicle and power supply system data (subject electric vehicle parameters 1220) collectively form at least a part of the input data 1202 or constraints for the intelligent power control module to predict the level of output power to obtain from individual batteries of a hybrid architecture in order to achieve a range or distance goal while accounting for safety, battery life and battery capacity of power supply systems 100 in electric vehicles, hereinafter referred to as attributes of the power supply systems 100.

Therefore, input data can be determined directly from measurements obtained from components of the electric vehicle. The input data can also be directly indicated in the information of a profile source. For example, a user may have an expressly stated preference for destination arrival time or a range goal during a specified period or until further modification of the preference.

The input data can also be derived from the information collected from a profile source. For example, an embodiment can be configured to analyze a calendar of a user to derive a destination arrival time. Furthermore, information such as texts or comments in a driving network may be analyzed, for example, contextually to determine upcoming traffic. In another example, the landscape of a geographic area may be obtained from an environment profile and examined to establish the nature of the terrain (e.g., the presence of steep slopes in a mountainous region as obtained from an imaging apparatus or database) and thus the need to increase the power output of a battery.

The input data as determined by an embodiment may be variable over time. For example, the user may prefer a predetermined route during short driving distances to and from work and may prefer a route that optimizes energy consumption during long-distance vacation trips. Thus, the preference can change when a vacation driving characteristic obtained from a user profile becomes a priority. In that case, the intelligent power control module may prioritize the use of a high energy density hybrid module 112 of a hybrid range extender battery 124 over the use of a traction module 122 of a traction battery 102 in order to extend the range of the traction battery 102.

Similarly, a drive to work may not require the use of a hybrid range extender battery 124. However, due to a determination that a normal work route has traffic and a contextual establishment that, for example, a user has a meeting in 1 hour, an "expeditious driving characteristic" of the user may be prioritized, thus causing the vehicle navigation system to abandon a normal route in favor of a new, albeit mountainous route. Based on predictive analytics about power or energy needed to traverse the mountainous route in under 1 hour being greater than an available traction battery power or energy or greater than at least a threshold power or energy, the power control module determines that a high energy density hybrid module 112 is needed to complete the drive to work. Even further, the power control module may be configured to independently and automatically pre-charge the traction battery 102 via bi-directional DC-DC converters 502 connected to the high energy density hybrid modules 112 to at least a threshold charge in anticipation of the drive upon the contextual establishment of the meeting.

Importantly, the power control module may control output power obtained from the one or more high energy density hybrid modules 112 while concurrently ensuring that the safety, maximum life cycle, and maximum capacity attributes of the individual high energy density hybrid modules 112 are considered. For example, upon determining, based on sensor information obtained about the independently measurable cells of a high energy density hybrid module 112 A, that the high energy density hybrid module 112 A has a fault, the power control module may deactivate module A and utilize high energy density hybrid module 112 B to pre-charge the traction battery 102, thus ensuring the safety of the battery pack and allowing the eventual restoration of deactivated module A through a formation recharge. In another example, upon determining that high energy density hybrid module 112 C has six life cycles remaining, the power control module may prioritize depleting module C before utilizing power from another module. User feedback indicative of the accuracy of output power to be retrieved from a high energy density hybrid module 112, determined by the power control module, is used to modify the power control module to produce better results.

Operating with profile information from one or more profile sources, an embodiment routinely evaluates the constraints that are applicable to the user of the electric vehicle. The embodiment may add new constraints/input data when found in profile information analysis, modify existing constraints when justified by the profile information analysis, and diminish the use of past constraints depending on the feedback, the observed usage of the constraint, and/or presence of support for the past constraint in the profile information. A past constraint can be diminished or aged by deprioritizing the constraint by some degree, including removal/deletion/or rendering ineffective the past constraint. Sources of profile information may include, for example, calendar entries in a phone, tablet, or other device paired to the vehicle and/or the management system; scheduling accounts, apps, or the like associated with a user to which the user may provide access; direct entry of information by a user; or the like. More generally, profile information may be obtained from any source available to the vehicle directly or indirectly which can be associated with a user or owner of the vehicle.

Operating with profile information from one or more profile sources, an embodiment forecasts the user's activity during future periods of time. For example, based on calendar data, the embodiment may determine, for example by NLP of the calendar entries, that the user plans to work at location A tomorrow at 9 AM, get lunch from 12 PM till 1 PM, and visit a doctor out of state after 3 PM. The embodiment derives energy requirements for tomorrow based on the calendar activities and either pre-charges the traction battery 102 using one or more high energy density hybrid modules 112 or assigns a high energy density hybrid module 112 to be used tomorrow. The assignment can also be done without the use of NLP to interpret the calendar data, as it is not intended to be limiting. Further, these examples of input data/constraints, prioritization, secondary considerations, etc., are not intended to be limiting. From this disclosure, those of ordinary skill in the art will be able to conceive many other aspects applicable towards a similar purpose, and the same are contemplated within the scope of the illustrative embodiments.

The intelligent power control systems and techniques described herein generally are unavailable in the conventional methods in the technological field of endeavor pertaining to electric vehicles. A method of an embodiment described herein, when implemented to execute on a device or data processing system, comprises substantial advancement of the functionality of that device or data processing system in power output proposals by obtaining constraints proposals and using a hybrid battery architecture that enables control of input and output currents while ensuring maximization of the safety, life and capacity attributes of modules of the hybrid battery architecture.

In further embodiments, a machine learning engine may be provided to increase the resolution and efficacy of predictions made by a controller based on a comparison of sensed and received information. The machine learning engine may detect patterns and weigh the probable outcomes and energy demand profiles based on these patterns. As a user engages with a vehicle, data regarding a trip may be collected and stored for analysis by the controller or another network-connected computerized device. Data regarding trips by multiple users in multiple electric vehicles may be aggregated to allow additional resolution in detecting patterns and predicting behavior.

For example, a driver may be traveling down a road, such as a county road that connects with an interstate. The geolocation sensors may detect that the vehicle is on the road and heading in the direction of the interstate. Data gathered by multiple vehicles may indicate that a majority of vehicles traveling down this county road in the direction of the interstate are likely to enter the interstate. The data gathered by multiple vehicles may initially indicate that drivers typically enter the interstate in a southbound direction, for example, the direction of a city or location with multiple workplaces.

The machine learning engine may use this information to predict an energy demand profile for a trip. This profile may be provided as a baseline, as it may be altered as real-world conditions may deviate from the predicted trip. With consideration to the example above, the driver of an electric vehicle may deviate from the predicted trip and drive past the interstate onramp. The machine learning engine may then determine a deviation from the predicted trip that has occurred and update the energy demand profile to reflect the next most likely scenario, such as traveling to a commonly-visited relative's house located 30 miles beyond the access point to the interstate, or another location.

In another example, provided without limitation, sensors located on a vehicle may detect the amount of torque required to move the electric vehicle in a forward direction. In this example, it may be determined that a substantially larger amount of torque is required to accelerate the vehicle. It may also be determined that a larger amount of regenerative energy is produced as the vehicle slows. The machine learning engine may determine that the vehicle is towing another mass. Calculations may be performed by the controller to modify the amount of stored energy required to complete a trip while towing the mass. These modifications may be applied and may affect the energy demand profile to reflect the trip's additional energy demands. For example, the controller may adjust the energy demand profile to anticipate a higher energy demand when towing a mass.

The machine learning engine's predictive profile may include an aggregated or baseline profile, which may indicate the general route characteristics and energy consumption needs from users as a whole. The machine learning engine's predictive profile may also include a local profile indicative of common trips performed by a user, common destinations, and other common characteristics relating to the same. In one embodiment, an energy demand profile may be generated per user. And this embodiment, a user may be identified by a dedicated key fob, a mobile computing device connected to the entertainment system of a vehicle, voice recognition, seat weight sensor, and/or other information indicative of the identity of an operator. The machine learning engine, upon recognizing the operator, may adjust its predictive model to adapt to the statistically probable routes, driving habits, and other useful characteristics of the operator. The energy demand profile may be adjusted accordingly with regard to the local profile associated with the operator.

The machine learning engine may operate by updating vehicle parameter assumptions and predicting a destination-weighted energy demand. At the onset of a trip, assumptions regarding the vehicle and an anticipated trip may be made. These assumptions may be supported by information determined by the vehicle and may be recorded as time-series data that may be used to calculate physics parameters. Example physics parameters may include speed, battery system net power, traction motor power, geolocation, and other parameters as would be appreciated by a person of skill in the art after having the benefit of this disclosure. Additional information may be derived, such as relating to the geolocation information, such as latitude, longitude, heading, altitude, velocity, acceleration, inertia, and other information.

The vehicle-derived information may be supplemented by information sourced via the network. Such information may include wind speed, weather information, route, distance to destination, elevation and terrain profile of a route, traffic, and other information that may affect the energy demands of a trip.

The machine learning engine may perform an analysis on the time series data gathered at the vehicle, supplemental information such as that provided over a network, and/or other information to draw correlations. For example, the machine learning engine may perform a linear algebra regression analysis on the time series step data to find the best-fit vehicle parameter values. Examples of best-fit vehicle parameter values may include mass, rolling resistance coefficient, aerodynamic drag coefficient, and other values that those of skill in the art would appreciate. The machine learning engine may additionally return vehicle parameters, for example, that may be used by the controller in energy management, such as mass, a rolling resistance coefficient, aerodynamic drag coefficient, average auxiliary electrical power load, and other return parameters that those of skill in the art would appreciate. An example calculation that may be used to determine average auxiliary electrical load power may be the sum of the battery system net power minus the sum of the traction motor power, without limitation.

The machine learning engine may advantageously assist with predicting a destination weighted energy need. This energy need may assist with determining whether to migrate electrical energy stored by the high-energy range battery to the high-power traction battery for use by an electric vehicle or other loads. In making the prediction, the machine learning engine may determine a route from a present location to various candidate charging locations. Trip information may be received by a navigation system included by a vehicle, directions provided by a user's mobile computing device, predicted based on the history of driver behavior, or the like. The presence of a charging location, such as a user's home or public charging facilities, may be determined based on trip history, internet provided sources, navigational directions, and other sources.

Charging location candidates may be favored if located within an acceptable proximate range of a trip destination. Favorite charging locations may be promoted in the calculation of anticipated energy demands by the machine learning engine. Similarly, disfavored charging locations may be deemphasized and/or removed when determining the anticipated energy demands of a trip.

Continuing the example given above, the machine learning engine may calculate various route options to direct an operator from an origin location to an indicated destination. The trip options may consider factors such as the presence of charging facilities, anticipated road stops, acceptable distances between charging facilities, unacceptable distances between charging facilities, elevation changes, traffic, and other characteristics relating to a respective route option. The machine learning engine may disfavor route options in which it appears are inaccessible with a current state of charge of an operator's vehicle.

In another example, provided without limitation, the machine learning engine may determine that the state of charge of the high-power traction battery is at about 50%. In this example, a first route, such as a most direct route, may need at least a 75% state of charge to reach a charging facility under normal operation. An alternative route may be identified that presents the user with the charging facility that requires only 25% state of charge to reach. The machine learning engine may then recommend the route providing earlier access to the charging facility and thus avoiding the necessity of bringing online at least part of the high-energy range battery.

Also, in this example, the operator may choose to override the recommended route, such as by driving on an alternative route. If it is determined that the operator chooses to take the disfavored route and begins heading in a direction indicative of following the disfavored route, the machine learning engine may direct that at least part of the high-energy range battery be brought online to provide supplemental energy that may be required to reach the charging facility located outside of an expected capacity remaining in the high-power traction battery.

The machine learning engine may provide various weights to sensed information, conditions, parameters, trip details, and other factors that may influence an estimated energy consumption required to comply with a predicted energy use profile, as will be appreciated by those of skill in the art. Example parameters that may be weighted to affect the predicted energy use profile may include geolocation, GPS location, time of day, day of the week, the mass of the vehicle, mass being towed by a vehicle, temperature, auxiliary power demands, rolling resistance coefficient, aerodynamic coefficient area, time since the battery package was last charged, time since the last charging session occurred at the candidate location, and/or other factors and parameters that would be apparent to a person of skill in the art after having the benefit of this disclosure.

The machine learning engine may then correlate these parameters to predict an energy need at least partially based on the weighted influence of considered parameters. For example, the machine learning engine may apply a calculation that considers the energy needs to be approximately equal to the sum of the mass included by the vehicle and other mass being towed by or carried by the vehicle. This value may be multiplied by the anticipated energy required to complete an anticipated route. The machine learning engine may then analyze these factors and predict an anticipated energy need profile relating to the anticipated trip. The controller of the battery package may then move power between the high-energy range battery and the high-power traction battery to compensate for any predicted deficiencies in the state of charge currently held by the high-power traction battery.

The redundancy features will now be discussed in greater detail. In one embodiment, redundancy features may be provided to mitigate the risk of one or more battery components experiencing total depletion of stored energy and/or failure. Multiple energy management components may be included, so that failure of one energy management component is unlikely to lead to failure of the system as a whole. In one example, a battery package may be included as a modular component, including a connected electric battery management component, high-power traction battery modules, high-energy range battery modules, cooling features, and/or other aspects to assist with storage and power delivery. In this example, should one of the modular components fail, the remaining modular components may continue to provide power delivery from its connected aspects.

In one embodiment, an independent observer module may be included to provide backup functionality otherwise provided by the energy management component. In this example, the independent observer module may continue to run a vehicle or other connected load from the electrical energy stored in the battery package, even in the case of failure of the energy management component otherwise connected to a respective battery package. For example, in a case of failure of connected energy management components, the redundant features of the independent observer module may take over the operation of energy management so that the connected load, for example, vehicle, may continue to operate substantially safely until such problems causing intervention by the independent observer module may be investigated and/or repaired. By providing such redundancy and safety features to mitigate failures of the system should they occur, a system enabled by this disclosure may be certified as an ASIL D architecture.

The illustrative embodiments are described with respect to certain types of data, functions, algorithms, equations, model configurations, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the invention's scope. Where an embodiment is described using a mobile device, any type of data storage device suitable for use with the mobile device may provide the data to such embodiment, either locally at the mobile device or over a data network, within the illustrative embodiments' scope.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the description's clarity. The illustrative embodiments may be used in conjunction with other comparable or similarly purposed structures, systems, applications, or architectures. For example, other comparable mobile devices, structures, systems, applications, or architectures, therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure, and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 10:
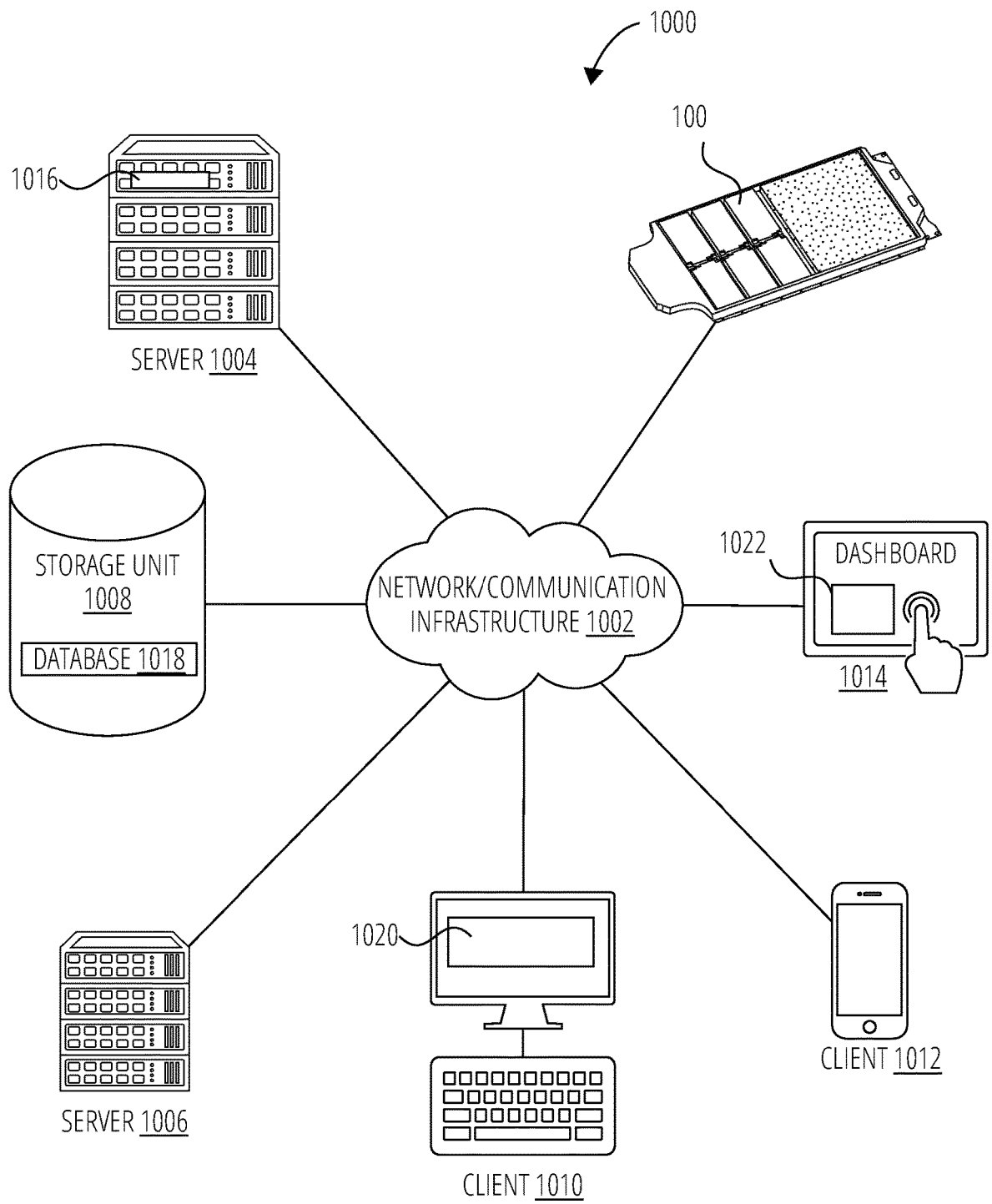
FIG. 10 depicts a block diagram of a network of data processing systems in which illustrative embodiments may be implemented.
Figure 11:
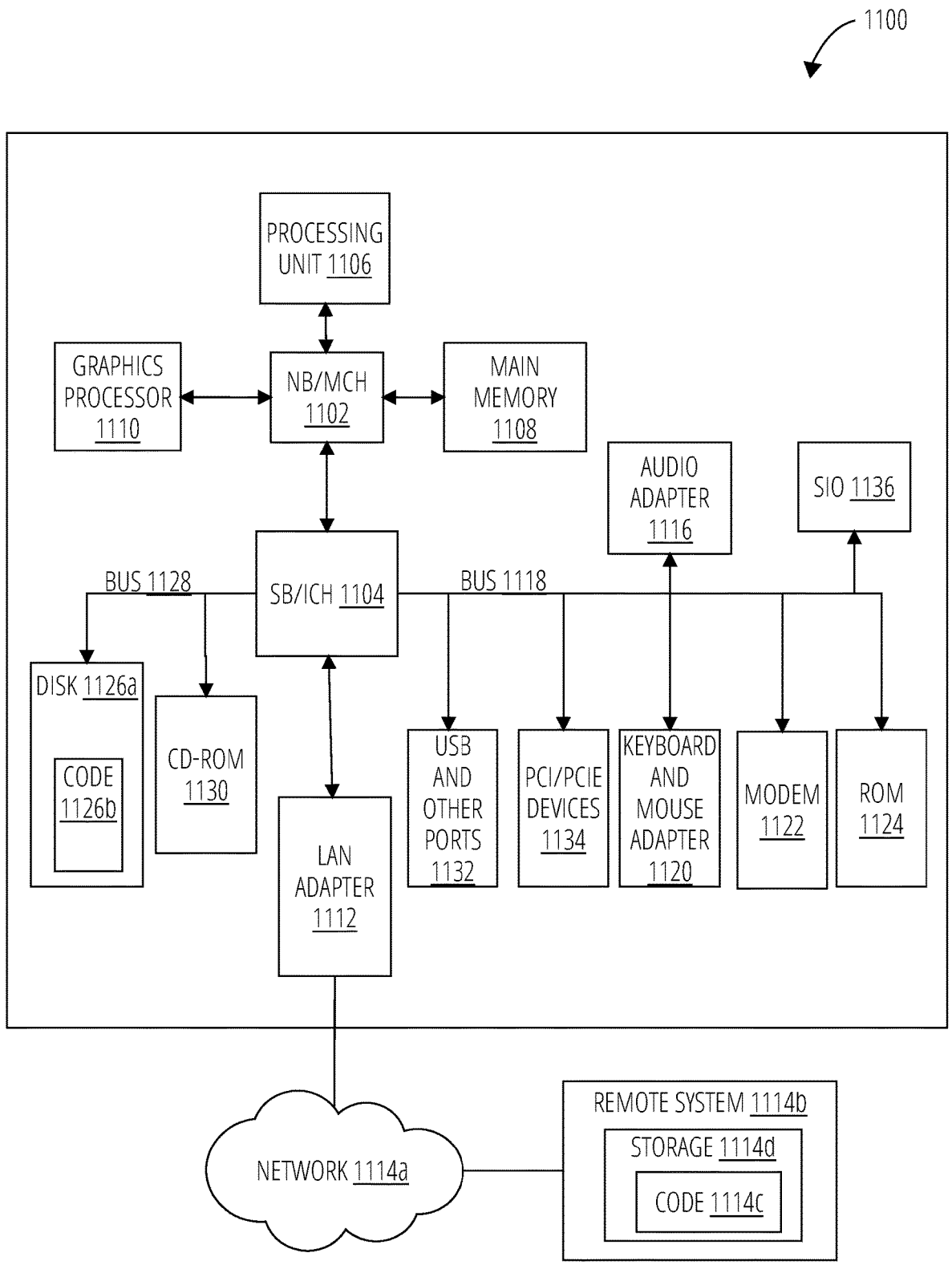
FIG. 11 depicts a block diagram of a data processing system in which illustrative embodiments may be implemented.

With reference to the figures and in particular with reference to FIG. 10 and FIG. 11, these figures are example diagrams of data processing environments in which illustrative embodiments may be implemented. FIG. 10 and FIG. 11 are only examples and are not intended to assert or imply any limitation with regard to the environments in which different embodiments may be implemented. A particular implementation may make many modifications to the depicted environments based on the following description.

FIG. 10 depicts a block diagram of a network of data processing systems in which illustrative embodiments may be implemented. Data processing environment 1000 is a network of computers in which the illustrative embodiments may be implemented. Data processing environment 1000 includes network/communication infrastructure 1002. Network/communication infrastructure 1002 is the medium used to provide communications links between various devices, databases, and computers connected within a data processing environment 1000. Network/communication infrastructure 1002 may include connections, such as wire, wireless communication links, or fiber optic cables.

Clients or servers are only example roles of certain data processing systems connected to network/communication infrastructure 1002 and are not intended to exclude other configurations or roles for these data processing systems. Server 1004 and server 1006 couple to network/communication infrastructure 1002 along with storage unit 1008. Software applications may execute on any computer in data processing environment 1000. Client 1010, client 1012, dashboard 1014 are also coupled to network/communication infrastructure 1002. Client 1010 may be a remote computer with a display. Client 1012 may be a mobile device configured with an application to send or receive information, such as to receive a charge condition of the power supply system 100 or to send information about a calendar of the user.

Dashboard 1014 may be located inside the electric vehicle and may be configured to send or receive any of the information discussed herein. A data processing system, such as server 1004 or server 1006, or clients (client 1010, client 1012, dashboard 1014) may contain data and may have software applications or software tools executing thereon.

Only as an example, and without implying any limitation to such architecture, FIG. 10 depicts certain components that are usable in an example implementation of an embodiment. For example, servers and clients are only examples and do not imply a limitation to a client-server architecture. As another example, an embodiment can be distributed across several data processing systems and a data network, as shown. In contrast, another embodiment can be implemented on a single data processing system within the scope of the illustrative embodiments. Data processing systems (server 1004, server 1006, client 1010, client 1012, dashboard 1014) also represent example nodes in a cluster, partitions, and other configurations suitable for implementing an embodiment.

Power supply system 100 includes a traction battery 102 containing one or more traction and a hybrid range extender battery 124 containing one or more high energy density hybrid modules 112. As discussed, the one or more high energy density hybrid modules 112 are configured with chemistry that prioritizes high energy density over available cycle life and said each high energy density hybrid module 112 including a corresponding hybrid module controller 118 and a plurality of cells connected in series, with each cell of the plurality of cells being configured to be independently measurable by said corresponding hybrid module controller 118.

Client application 1020, dashboard application 1022, or any other application such as server application 1016 implements an embodiment described herein. Any of the applications can use data from power supply system 100 and profile sources to predict power or energy requirements. The applications can also obtain data from storage unit 1008 for predictive analytics. The applications can also execute in any data processing systems (server 1004 or server 1006, client 1010, client 1012, dashboard 1014).

Server 1004, server 1006, storage unit 1008, client 1010, client 1012, dashboard 1014 may couple to network/communication infrastructure 1002 using wired connections, wireless communication protocols, or other suitable data connectivity. Client 1010, client 1012, and dashboard 1014 may be, for example, mobile phones, personal computers, or network computers.

In the depicted example, server 1004 may provide data, such as boot files, operating system images, and applications to client 1010, client 1012, and dashboard 1014. Client 1010, client 1012, and dashboard 1014 may be clients to server 1004 in this example. Client 1010, client 1012, and dashboard 1014 or some combination thereof may include their own data, boot files, operating system images, and applications. Data processing environment 1000 may include additional servers, clients, and other devices that are not shown.

Server 1006 may include a search engine configured to search information, such as terrain condition, speed limits, user feedback, alternate profile sources, GPS information, traffic status, or otherwise driving characteristics as well as battery measurements(e.g., real-time battery measurements from individual cells of the high energy density hybrid modules 112) in response to a request from an operator for power delivery as described herein with respect to various embodiments.

In the depicted example, data processing environment 1000 may be the Internet. Network/communication infrastructure 1002 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 1000 also may be implemented as a number of different types of networks, such as, for example, an intranet, a local area network (LAN), or a wide area network (WAN). FIG. 10 is intended as an example and not as an architectural limitation for the different illustrative embodiments.

Among other uses, data processing environment 1000 may be used for implementing a client-server environment in which the illustrative embodiments may be implemented. A client-server environment enables software applications and data to be distributed across a network such that an application functions by using the interactivity between a client data processing system and a server data processing system. Data processing environment 1000 may also employ a service-oriented architecture where interoperable software components distributed across a network may be packaged together as coherent business applications. Data processing environment 1000 may also take the form of a cloud and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

FIG. 11 depicts a block diagram of a data processing system in which illustrative embodiments may be implemented. The data processing system 1100 is an example of a computer, such as a client 1010, client 1012, dashboard 1014 or s server 1004, server 1006, in FIG. 10, or another type of device in which computer usable program code or instructions implementing the processes may be located for the illustrative embodiments.

The data processing system 1100 is described as a computer only as an example, without being limited thereto. Implementations in the form of other devices, in FIG. 10, may modify data processing system 1100, such as by adding a touch interface and even eliminate certain depicted components from the data processing system 1100 without departing from the general description of the operations and functions of the data processing system 1100 described herein.

In the depicted example, the data processing system 1100 employs a hub architecture including North Bridge and memory controller hub (NB/MCH) 1102 and South Bridge and input/output (I/O) controller hub (SB/ICH) 1104. The processing unit 1106, main memory 1108, and graphics processor 1110 are coupled to North Bridge and memory controller hub (NB/MCH) 1102. Processing unit 1106 may contain one or more processors and may be implemented using one or more heterogeneous processor systems. The processing unit 1106 may be a multi-core processor. Graphics processor 1110 may be coupled to North Bridge and memory controller hub (NB/MCH) 1102 through an accelerated graphics port (AGP) in certain implementations.

In the depicted example, local area network (LAN) adapter 1112 is coupled to South Bridge and input/output (I/O) controller hub (SB/ICH) 1104. Audio adapter 1116, keyboard and mouse adapter 1120, modem 1122, read-only memory (ROM) 1124, universal serial bus (USB) and other ports 1132, and PCI/PCIe devices 1134 are coupled to South Bridge and input/output (I/O) controller hub (SB/ICH) 1104 through bus 1118. Hard disk drive (HDD) or solid-state drive (SSD) 1126*a* and CD-ROM 1130 are coupled to South Bridge and input/output (I/O) controller hub (SB/ICH) 1104 through bus 1128. PCI/PCIe devices 1134 may include, for example, Ethernet adapters, add-in cards, and PC cards for notebook computers. PCI uses a card bus controller, while PCIe does not. Read-only memory (ROM) 1124 may be, for example, a flash binary input/output system (BIOS). Hard disk drive (HDD) or solid-state drive (SSD) 1126*a* and CD-ROM 1130 may use, for example, an integrated drive electronics (IDE), serial advanced technology attachment (SATA) interface, or variants such as external-SATA (eSATA) and micro-SATA (mSATA). A super I/O (SIO) device 1136 may be coupled to South Bridge and input/output (I/O) controller hub (SB/ICH) 1104 through bus 1118.

Memories, such as main memory 1108, read-only memory (ROM) 1124, or flash memory (not shown), are some examples of computer usable storage devices. Hard disk drive (HDD) or solid-state drive (SSD) 1126*a*, CD-ROM 1130, and other similarly usable devices are some examples of computer usable storage devices, including a computer-usable storage medium.

An operating system runs on processing unit 1106. The operating system coordinates and provides control of various components within data processing system 1100 in FIG. 11. The operating system may be a commercially available operating system for any type of computing platform, including but not limited to server systems, personal computers, and mobile devices. An object-oriented or another type of programming system may operate in conjunction with the operating system and provide calls to the operating system from programs or applications executing on a data processing system 1100.

Instructions for the operating system, the object-oriented programming system, and applications or programs, such as application 1016 and client application 1020 in FIG. 10, are located on storage devices, such as in the form of codes 1126*b* on Hard disk drive (HDD) or solid-state drive (SSD) 1126*a*, and may be loaded into at least one of one or more memories, such as main memory 1108, for execution by processing unit 1106. The processes of the illustrative embodiments may be performed by processing unit 1106 using computer implemented instructions, which may be located in a memory, such as, for example, main memory 1108, read-only memory (ROM) 1124, or in one or more peripheral devices.

Furthermore, in one case, code 1126*b* may be downloaded over network 1114*a* from remote system 1114*b*, where similar code 1114*c* is stored on a storage device 1114*d* in another case, code 1126*b* may be downloaded over network 1114*a* to remote system 1114*b*, where downloaded code 1114*c* is stored on a storage device 1114*d*.

The hardware in FIG. 10 and FIG. 11 may vary depending on the implementation. Other internal hardware or peripheral devices, such as flash memory, equivalent non-volatile memory, or optical disk drives, and the like, may be used in addition to or in place of the hardware depicted in FIG. 10 and FIG. 11. In addition, the processes of the illustrative embodiments may be applied to a multiprocessor data processing system.

In some illustrative examples, data processing system 1100 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 1108 or a cache, such as a cache found in North Bridge and a memory controller hub (NB/MCH) 1102. A processing unit may include one or more processors or CPUs.

The depicted examples in FIG. 10 and FIG. 11 and the above-described examples are not meant to imply architectural limitations. For example, the data processing system 1100 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of the data processing system 1100 using a virtualized manifestation of some or all components depicted in data processing system 1100. For example, in a virtual machine, virtual device, or virtual component, processing unit 1106 is manifested as a virtualized instance of all or some number of hardware processing units 1106 available in a host data processing system, main memory 1108 is manifested as a virtualized instance of all or some portion of main memory 1108 that may be available in the host data processing system, and Hard disk drive (HDD) or solid-state drive (SSD) 1126*a* is manifested as a virtualized instance of all or some portion of Hard disk drive (HDD) or solid-state drive (SSD) 1126*a* that may be available in the host data processing system. The host data processing system in such cases is represented by data processing system 1100.

Figure 12:
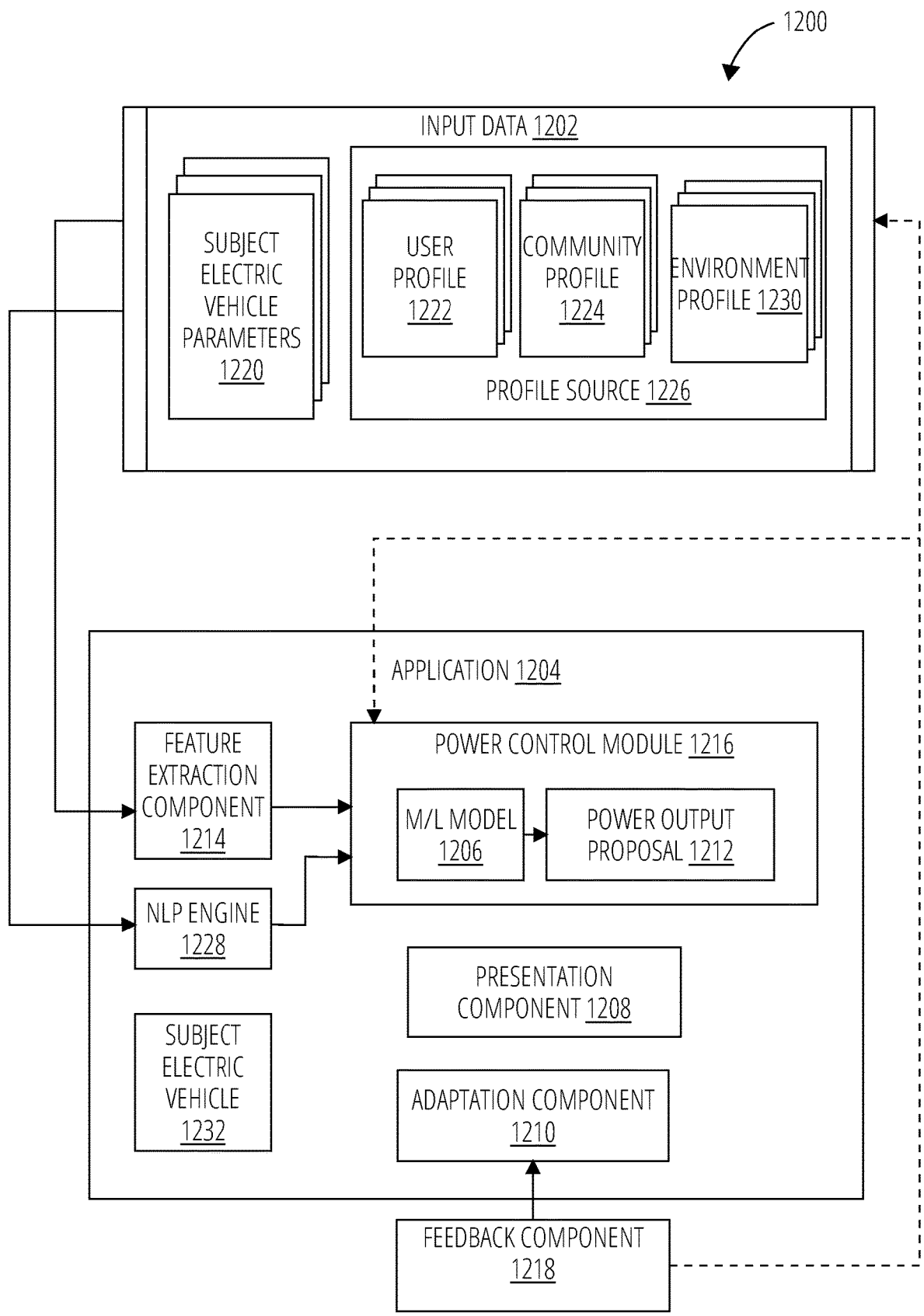
FIG. 12 depicts a configuration for intelligent power output proposals in accordance with an illustrative embodiment.

Concerning FIG. 12, this figure depicts a diagram of an example configuration for intelligent power control in accordance with an illustrative embodiment. The intelligent power control can be implemented using application 1204 in FIG. 12. Application 1204 is an example of server application 1016, client application 1020, or dashboard application 1022 in FIG. 10. The application 1204 receives or monitors, for example, in real-time, a set of input data 1202. The input data comprises subject electric vehicle parameters 1220 such as a current of a high energy density hybrid module, temperature of individual cells 114 and that of their neighbors, voltages of the cells 114, impedances of the cells 114, state of health of the cells 114, the capacity of the cells 114, computed polarization curves or charge-discharge curves 500 of the cells 114 identifying graphitization plateaus, vehicle maximum speed/acceleration, total vehicle mass, vehicle aerodynamic drag force, location, nearest charging stations, etc. The input data also comprises driving characteristics from profile sources 1226 (user profile 1222, community profile 1224, environment profile 1230) such as user preferences, number of planned stops in a trip, average daily driving distance, past driving energy consumption per mile, duration of stops, calendar data, and environmental data such as terrain data, road slope angle, air drag coefficient, road rolling resistance coefficient and the like.

In one or more embodiments described herein, characteristics, properties, and/or preferences associated with a user, a community, an environment, a subject electric vehicle, a power supply system, etc., are referred to as "features." In one or more embodiments, configuration 1200 defines and configures an algorithm and/or rule to drive feature selection results. In particular embodiments, an algorithm may include, for example, determining the lowest common value for a feature and determining whether the value satisfies the best match within a threshold value (e.g., 90%) of the feature among the users. In an embodiment, the system may prioritize certain features so that features such as safety of battery modules, or time of arrival, or SOH or driving distance carry different weights. In an embodiment, after the common denominator in a fleet of vehicles is found, configuration 1200 understands the problems with individual vehicles and extracts and derives the best feature values that will help control a subject electric vehicle's power.

In an embodiment, feature extraction component 1214 is configured to generate relevant features, based on contents of a request from application 1204, for the subject electric vehicle using data from all the different available features (e.g., subject electric vehicle parameters 1220, the user profile 1222, community profile 1224, environment profile 1230). In the embodiment, feature extraction component 1214 receives a request from an application, 1204 which includes at least an identification of a subject electric vehicle 1232 and/or a user or location thereof as well as instructions to propose a power output to obtain from one or more high energy density hybrid modules 112 to complete a 10-mile trip. Using the subject electric vehicle 1232 and/or user information, feature extraction component 1214 obtains a combination of specific subject electric vehicle parameters 1220, user profile information from user profile 1222, community profile information from community profile 1224 environmental data from environment profile 1230. In the embodiment, feature extraction component 1214 uses a defined algorithm of prioritization to generate the features as feature profiles. In a particular embodiment, the feature profile includes each feature (e.g., 1. current in cells 114, 2. temperature of cells 114, 3. voltages of cells 114, 4. impedances of cells 114, 5. user calendar, 6. GPS location, 7. destination, 8. range requirements, 9. state of health audit report indicative of safety, capacity, and remaining life cycles of the cells 114 and 10. weights are given to each feature). Using the extracted features and a trained M/L model 1206 trained using a large number of different datasets, power control module 1216 determines a power output proposal 1212 for the subject electric vehicle 1232. The main benefit of a hybrid architecture that employs a chemical composition that prioritizes high energy density over the available number cycles for which the cells 114 may be charged and/or discharged is that a range of the traction battery 102 of a power supply system 100 is significantly increased. Further, by individually controlling the current input and output of the high energy density hybrid modules 112 having series-connected cells 114, a highly modular architecture is obtained that increases safety of the individual cells 114 or modules through, for example, an ability to control, upon the detection of a short circuit, which modules are activated or deactivated to prevent a localized fault from causing further damage. By modularly controlling the high energy density hybrid modules 112 based on measurements obtained about their component cells 114, a maximum life cycle of each high energy density hybrid module 112 can be ensured by the mere prevention of rapid degradation of cells typically associated with undetected cellular issues in parallel connected cells of conventional solutions. For example, if one cell overheats and is undetected, it may start a chain reaction that affects other cells. An ability to control the current of the individual series-connected cells and their rate of charging/discharging through balance devices 128 in a modular fashion ensures that the maximum capacities of the cells 114 and thus their available life cycles are preserved. Thus, by employing a power control module 1216 that is based on a machine learning model that takes preferences and subject electric vehicle health parameters into account, the output of individual high energy density hybrid modules 112 can be controlled intelligently and in real-time to efficiently address the changing energy demands of the vehicle while allowing the user to achieve said user's range or destination goals without compromising the benefits afforded by the hybrid architecture. In an embodiment, the power control module 1216 is trained to maximize said benefits as discussed herein.

Turning back to FIG. 12, the feature extraction component 1214 may be incorporated in a deep neural network. The feature extraction component 1214 may alternatively be outside the deep neural network. The power control module 1216 uses the obtained features from the feature extraction component 1214 to generate a power output proposal 1212, which may include, for example, information about a power or energy or C-rate 522 required to run one or more bi-directional DC-DC converters 502 to meet an immediate or extended distance or range goal based on a request from application 1204. The power output proposal 1212 may also contain information indicative of a predicted state of one or more components of the power supply system 100 and instructions to mitigate predicted/potential failure modes. Further, the power output proposal 1212 may contain information about which one or plurality of high energy density hybrid modules 112 to obtain the defined power output from, a charging or discharging rate of cells 114 or the traction battery through the one or more bi-directional DC-DC converters 502, a time to begin said charging or discharging, an optimized route, and the like. These examples are not meant to be limiting, and any combination of these and other example power output proposals are possible in like of the descriptions. The power control module 1216 can be based, for example, on a neural network such as a recurrent neural network (RNN) and a dynamic neural network (DNN), although it is not meant to be limiting. An RNN is a type of artificial neural network designed to recognize patterns in sequences of data, such as numerical times series prediction or forecasting and numerical time series anomaly detection using data emanating from sensors, generating image descriptions and text summarization. RNNs use recurrent connections (going in the opposite direction that the "normal" signal flow), which form cycles in the network's topology. Computations derived from earlier input are fed back into the network, which gives an RNN a "short-term memory." Feedback networks, such as RNNs, are dynamic; their 'state' is changing continuously until they reach an equilibrium point. For this reason, RNNs are particularly suited for detecting relationships across time in a given set of data. Recurrent networks take as their input not just the current input example they see but also what they have perceived previously in time. The decision a recurrent net reached at time step t−1 affects the decision it will reach one moment later at time step t. Thus, recurrent networks have two sources of input, the present and the recent past, which combine to determine how they respond to new data. A DNN relies on a on dynamic declaration of network structure. In conventional static models, a computation graph (that is a symbolic representation of a computation by a neural network is usually defined) and then examples are fed into an engine that executes this computation and computes its derivatives. However, with a static graph, input sizes have to be defined at the beginning, which can be non-convenient for applications with changing inputs. In a DNN however, a dynamic declaration strategy is used, wherein a computation graph is implicitly constructed by executing procedural code that computes the network outputs, with the ability to use different network structures for each input. Thus, in a training process, the computation graph can be defined anew for every training example. Thus, the computational graph is built up dynamically, immediately after input variables are declared. The graphs are therefore flexible and allow the modification and inspection of the internals of the graph at any time. Thus instead of having to maintain the relationships between all inputs to the neural network and the layers of the neural network, a decision can be made that upon a defined parameter crossing a threshold level in which its priority increases, the structure of the neural network is dynamically changed to cause a corresponding change in the output that addresses the new functional requirements of the power supply system 100 caused by the priority increase, and vice versa. Thus, in dynamic neural networks, the outputs depend on the current and past values of inputs, outputs, and the network structure. Neural networks with such feedback are appropriate for system modeling, identification, control and filtering operations and are particularly important for non-linear dynamical power supply systems. Of course, the examples are non-limiting and other examples can be obtained in light of the specification.

In an illustrative embodiment, the power output proposals 1212 may be presented by a presentation component 1208 of application 1204. An adaptation component 1210 is configured to receive input from a user to adapt the power output proposals 1212 if necessary. For example, changing a route proposed by the power control module 1216 causes a recalculation of a proposed power output that takes the terrain and distance of the new route into consideration.

Feedback component 1218 optionally collects user feedback 1224 relative to the power output proposals 1212. In one embodiment, application 1204 is configured not only to compute power output proposals 1212 but also to provide a method for a user to input feedback, where the feedback is indicative of the accuracy of the computed power output proposals 1212. Feedback component 1218 applies the feedback in a machine learning technique such as to profiles 1222, 1224, 1230, or to M/L model 1206 in order to modify the M/L model 1206 for better proposals. In an illustrative embodiment, the application analyzes said feedback input, and the application reinforces the M/L model 1206 of the power control module 1216. If the feedback is positive or unsatisfactory as to the accuracy of the proposal, the application strengthens or weakens parameters of the M/L model 1206, respectively. In an example, a proposal was to turn on the hybrid range extender battery 124 30 miles before reaching a mountain such that and at the top of the mountain, there would be enough battery capacity and power to not need to limit power at the top of the mountain. However, upon determining that power at the top of the mountain was actually limited and thus a lower speed than expected could be maintained, feedback is provided to the power control module 1216 about the inaccuracy of the proposal/prediction.

The input layer of the neural network model can be, for example, a vector representative of a current, voltage, or impedance values of cells 114, pixels of 2D images of terrain data, contextual calendar data provided by an NLP engine 1228, etc. In an example, a CNN (convolutional neural network) uses convolution to extract features from an input image. In an embodiment, upon receiving a request to provide a proposal, application 1204 creates an array of values that are input to the input neurons of the M/L model 1206 to produce an array that contains the power output proposals 1212.

Figure 13:
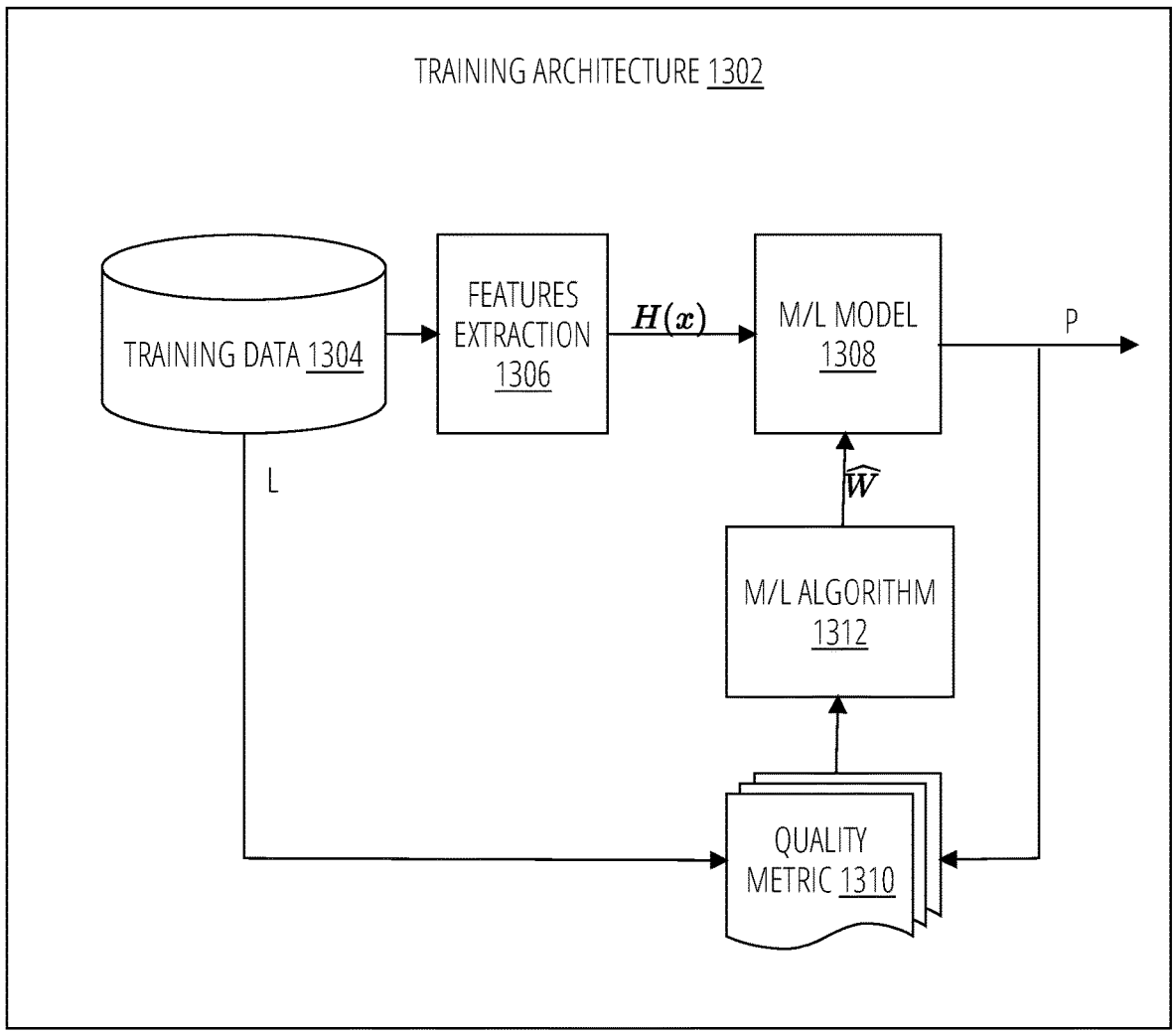
FIG. 13 depicts a block diagram of an example configuration for training a machine learning model in accordance with an illustrative embodiment.

The neural network M/L model 1206 is trained using various types of training data sets, including stored profiles and a large number of sample vehicular and cell measurements. As shown in FIG. 13, which depicts a block diagram of an example training architecture 1302 for machine-learning-based recommendation generation in accordance with an illustrative embodiment, program code extracts various features 1306 from training data 1304. The components of the training data 1304 have labels L. The features are utilized to develop a predictor function, H(x), or a hypothesis, which the program code utilizes as an M/L model 1308. In identifying various features in the training data 1304, the program code may utilize various techniques including, but not limited to, mutual information, which is an example of a method that can be utilized to identify features in an embodiment. Other embodiments may utilize varying techniques to select features, including but not limited to principal component analysis, diffusion mapping, a Random Forest, and/or recursive feature elimination (a brute force approach to selecting features), to select the features. "P" is the output (e.g., power output value, high energy density hybrid module 112 from which to obtain power output value, etc.) that can be obtained, which when received, could further trigger the power supply system 100 or vehicle to perform other steps such steps of a stored instruction. The program code may utilize a machine learning m/l algorithm 1312 to train M/L model 1308, including providing weights for the outputs, so that the program code can prioritize various changes based on the predictor functions that comprise the M/L model 1308. The output can be evaluated by a quality metric 1310.

By selecting a diverse set of training data 1304, the program code trains M/L model 1308 to identify and weight various features of the subject electric vehicle 1232, drivers, a fleet of vehicles, environmental conditions, etc. To utilize the M/L model 1308, the program code obtains (or derives) input data or features to generate an array of values to input into input neurons of a neural network. Responsive to these inputs, the output neurons of the neural network produce an array that includes the power output proposals 1212 to be presented or used contemporaneously.

Figure 14:
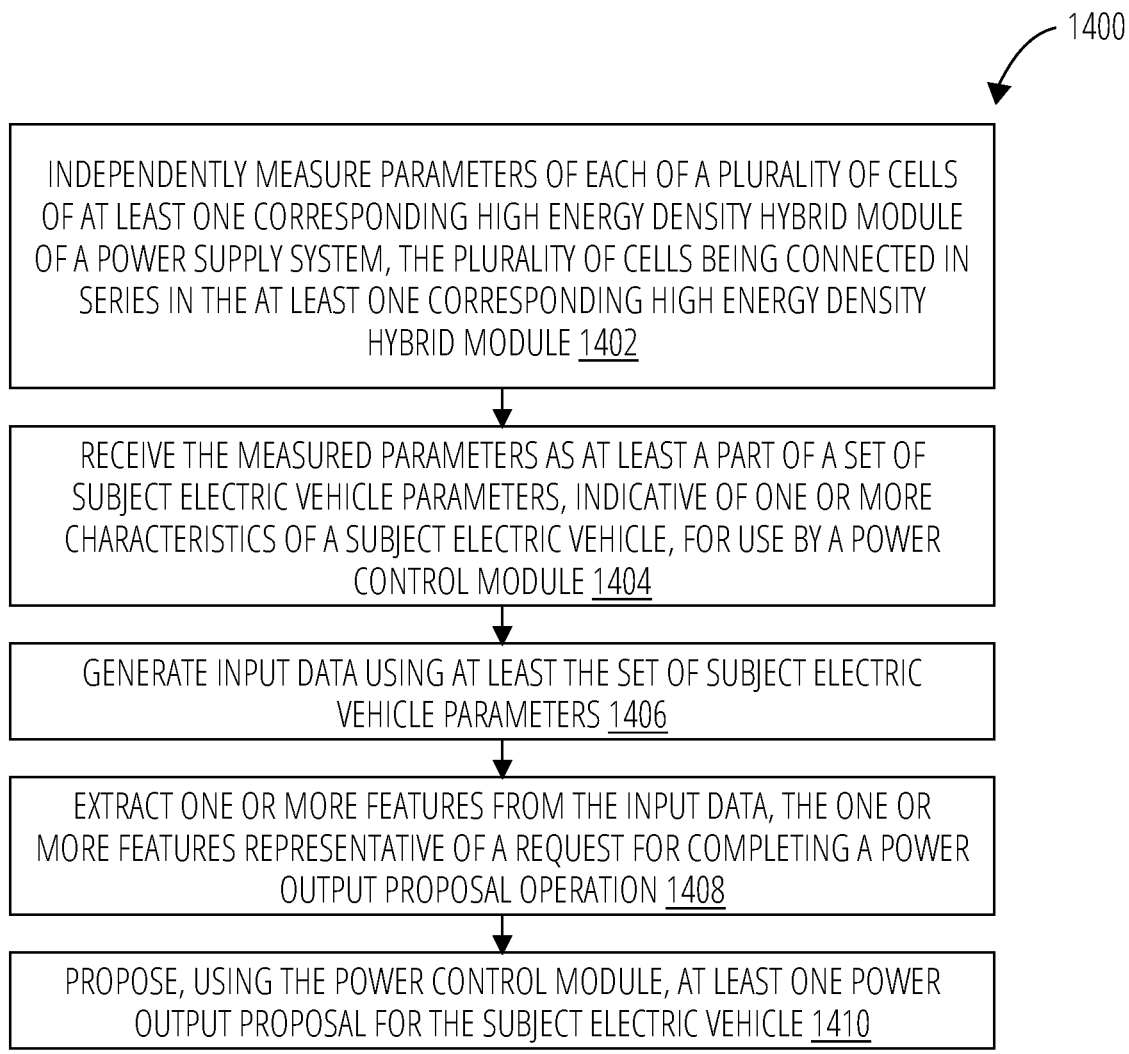
FIG. 14 depicts a flowchart of an example process in accordance with an illustrative embodiment.

With reference to FIG. 14, this figure depicts a flowchart of an example process 1400 for providing a power output proposal for an electric vehicle in accordance with an illustrative embodiment. Process 1400 can be implemented using application 1204 in FIG. 12.

In step 1402, process 1400 independently measures, by at least one hybrid module controller (HMC), parameters of each of a plurality of cells of at least one high energy density hybrid module of a power supply system. The plurality of cells is connected in series in at least one high-energy-density hybrid module.

In step 1404, process 1400 receives the cells' measured parameters as at least a part of a set of subject electric vehicle parameters, indicative of one or more characteristics of a subject electric vehicle, for use by a power control module. The parameters may include at least current, temperature, and voltage. Other parameters, including a capacity, polarization curve with graphitization plateaus, and impedances (DC IR, AC IR), may be derived from single or time-series measurements of the current, temperature, and voltage. For example, the polarization curve with graphitization plateaus (where iron interpolation occurs) may be used by process 1400 to interpret the kind of failure happening in a cell 114, e.g., loss of lithium, or loss of active sites to store lithium, etc.

Figure 15:
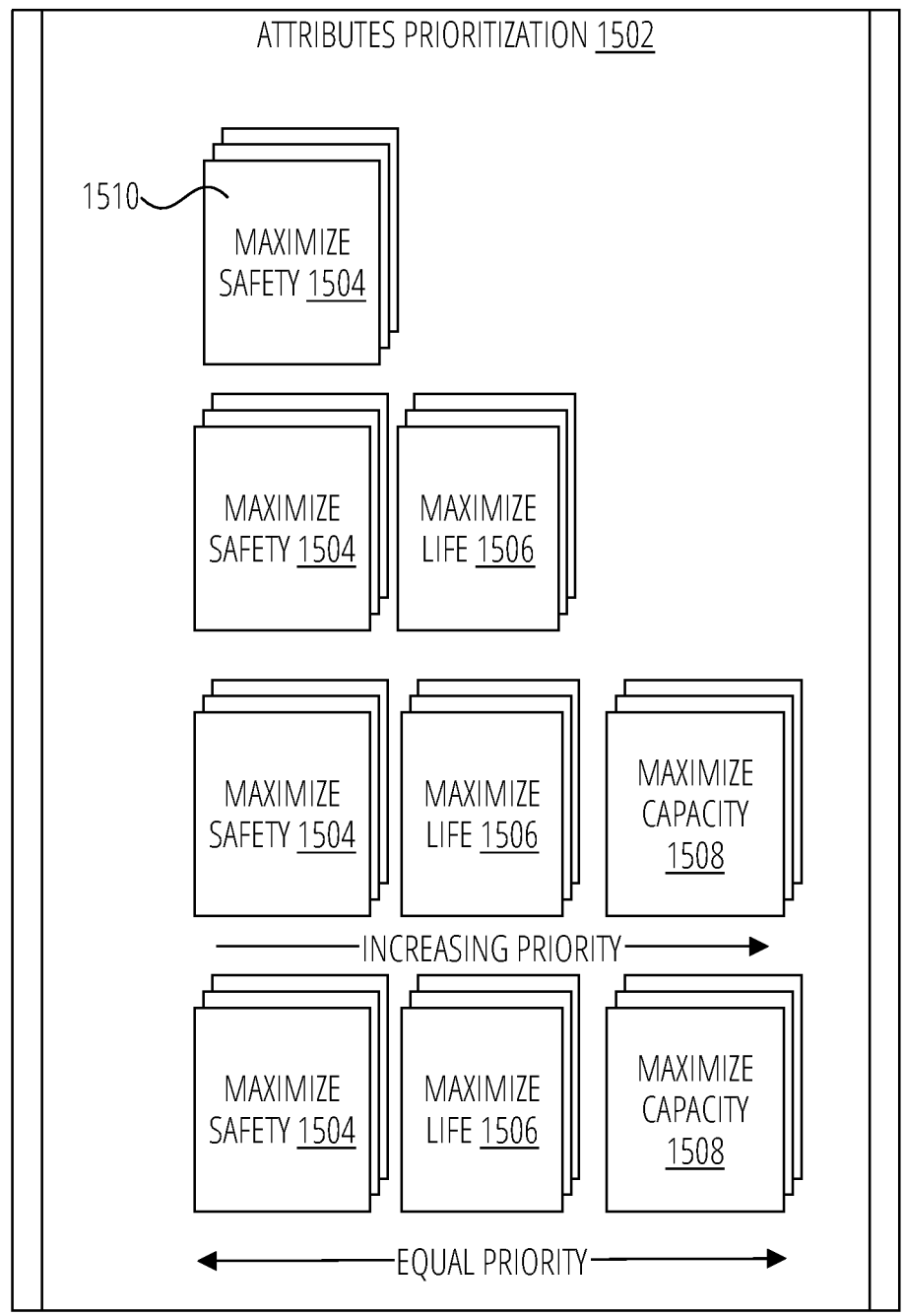
FIG. 15 depicts a block diagram of an example prioritization of attributes in accordance with an illustrative embodiment.

In step 1406, process 1400 generates input data using at least the set of subject electric vehicle parameters. In step 1408, process 1400 extracts one or more features from the input data, the one or more features are representative of a request for completing a power output proposal operation such as a calendar of a user who has an upcoming meeting. The feature extraction may be separate from the model or included in one or more layers of the model tuned during training. The one or more features may also represent attributes obtained from an attributes prioritization 1502 step, as shown in FIG. 15. In the attributes prioritization 1502, one or more attributes 1510 to consider in a power output proposal operation are obtained. The one or more attributes may have different assigned priorities or weights or may have the same or even unassigned priority or weight. By training the M/L model 1206 with a large set of different datasets that consider the attributes 1510, different scenarios can be handled by the power control module 1216. In an illustrative and non-limiting embodiment, the attributes 1510 include instructions to maximize or enforce a safety attribute 1504, maximize a life attribute 1506, and maximize a capacity attribute 1508. In step 1410, process 1400 proposes, using the power control module, at least one power output proposal for the subject electric vehicle.

The at least one power output proposal may account for an attribute, due to an attributes prioritization 1502, a maximum safety 1504 of the power supply system 100. In an illustrative embodiment, maximizing safety represents accounting for a possible or observed activity happening in cell chemistry (e.g., a short circuit between an anode and cathode, manifesting as a self-discharge), wherein the power control module 1216 proposes and implements a suspension of an operation of a segment/high energy density hybrid module 112 of a battery pack without affecting other modules/high energy density hybrid modules 112, a step that is otherwise unavailable in conventional battery packs. The implementation can also include moving energy away from said high energy density hybrid module 112 or discharging it and turning it off to isolate it for safety benefit. Further, by observing an abnormal temperature rise without any corresponding current changes, power control module, 1216 may deduce a fire event, a circuit board failure, or the like and thus discharge a corresponding module proximal to that temp rise to avoid propagation of the fire or failure. In another example, by observing a loss in isolation between a chassis 304 and a high-voltage bus, the power control module reduces the state of charge of one or more modules and provides a service warning, thus maximizing the safety of the power supply system 100 and thus of the electric vehicle.

The at least one power output proposal may account for an attribute prioritization 1502, a maximum life 1506 of the power supply system 100. In an illustrative embodiment, maximizing life comprises maximizing the health of cells 114, i.e., a cell's capability to discharge current. By observing an increase in a battery's impedance, the power supply system 100 causes a change in the maximum current of the cells 114 to avoid overheating or "over-stressing" the cells 114 to maximize the life of the cells 114. Thus, defined discharge power is determined to complement the state of health of the cells 114. In the embodiment, impedance is measured based on a discharge and recharge of cells and a comparison of the discharge parameters and recharge to an ideal standard, wherein the cells 114 are graded in a SOH grading operation. The cells 114 are graded, for example, as A, B, C, D, and E, with A representing a high SOH and E representing a low SOH. Thus, in the embodiment, all modules with cells 114 that are graded D and E may be operated by the power control module 1216 at a C-rate 522 of C/10, and modules having cells that are graded B and C may be operated at a C-rate 522 of C/5 and modules with cells that are graded A may be operated at a C-rate 522 of C/3, the operated C-rates 522 being a discharge power limit of the respective high energy density hybrid modules 112. The power control module 1216 keeps learning and adjusting according to these limits in conjunction with the safety and capacity attributes. Thus, if one cell 114 graded A and its module are taken offline because of a safety issue, another cell 114 may be upgraded from B to A or its module configured for harder duty cycles due to the absence of the offlined cell 114).

The at least one power output proposal may account for, due to an attributes prioritization 1502, a maximum capacity 1508 of the power supply system 100. In an illustrative embodiment, maximizing capacity recognizes an impedance problem of a cell. For a cell having a high impedance, the power control module 1216 may operate the corresponding high energy density hybrid module 112 at the lowest C-rate 522, providing energy over the longest time and thus maximizing capacity even though operating it first would not be likely based solely on lifetime attribute 1510. Further, for a series string of cells in a group, the capacity of the group is limited by the weakest cell. If all cells have 100AH and weakest hast 60AH, the weakest cell limits the other cells since once a charge of zero is reached, the rest of the cells in the series string cannot be discharged further to avoid damaging the weakest cell. The power control module 1216 operates to avoid divergence of capacities between cells in order to protect the weakest cell and not aggravate it. Moreover, the power control module 1216 may implement discharging and slowly charging the weakest cell in a formation charge to restore the capacity of the cell.

Thus, in an illustrative embodiment, the power control module 1216 operates based on a system of merits and demerits that functions to maximize life, safety, capacity, and other attributes while also considering input data such as geography, maximum current and speed and predicting how to benefit attributes goals by looking at all the inputs. Doing a SOH check frequently/periodically allows the grading of cells/modules to keep track of their health for decision making. For example, using a calendar to see an upcoming trip and SOH check may be conducted to identify a weak battery module to determine if it can be improved. An identified weak battery module may be charged very slowly ahead of the trip to fix a health problem for use during the trip.

Thus, a computer-implemented method, system or apparatus, and computer program product are provided in the illustrative for electric vehicle power supply and other related features, functions, or operations. Where an embodiment of a portion thereof is described with respect to a type of device, the computer-implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail) or other light-weight client-applications. The user does not manage or control the underlying cloud infrastructure, including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include the computer-readable storage medium (or media) having the computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, including but not limited to computer-readable storage devices as used herein, is not to be construed as being transitory signals per se, such as radio waves or other freely propagating electromagnetic waves, electromagnetic waves propagating through a waveguide, or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

The computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, to perform aspects of the present invention.

Aspects of the present invention are described herein concerning flowchart illustrations and/or block diagrams of methods, apparatus (systems), and computer program products according to embodiments of the invention. It will be understood that computer readable program instructions can implement each block of the flowchart illustrations and/or block diagrams and combinations of blocks in the flowchart illustrations and/or block diagrams.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
in a power supply system of an electric vehicle comprising a traction battery and a range extender battery separate from the traction battery, measuring, by at least one hybrid module controller (HMC), parameters of a plurality of cells in the range extender battery;
receiving the measured parameters as a part of a set of electric vehicle parameters, the electric vehicle parameters being indicative of one or more characteristics of the electric vehicle, for use by a power control module of the electric vehicle;
generating, at least partially based on the electric vehicle parameters, one or more features representative of a characteristic of a request for completing a power output proposal operation, and
proposing, using the power control module, at least one power output proposal for the electric vehicle.

2. The method of claim 1, further comprising:
generating a set of attributes of the power supply system wherein the at least one power output proposal is further based on the attributes.

3. The method of claim 2, wherein the attributes include a safety attribute of the power supply system, a capacity attribute of the power supply system or a life cycle attribute of the power supply system.

4. The method of claim 1, wherein the power output proposal comprises instructions for the at least one HMC to manage a power generating mode of the power supply system.

5. The method of claim 1, wherein the plurality of cells comprise at least one cell having a chemistry that prioritizes high energy density over available cycle life.

6. The method of claim 1, wherein each cell of the plurality of cells is independently measurable by said corresponding HMC.

7. The method of claim 1, wherein the input data further comprises information selected from the group consisting of: information about a user of the electric vehicle, information about a fleet of other power supply systems and information about an environment of the subject electric vehicle.

8. The method of claim 1, further comprising:
charging the traction battery based on the at least one power output proposal.

9. The method of claim 1, wherein the power control module implements a machine learning algorithm to evaluate power output proposals including the at least one power output proposal for the electric vehicle.

10. A battery management system for an electric vehicle having a traction battery and a range extender battery separate from the traction battery, the battery management system comprising:
a battery management system comprising at least one hybrid module controller (HMC), the HMC configured to measure parameters of a plurality of cells of the range extender battery;
a power control module configured to:
receive the measured parameters as a part of a set of electric vehicle parameters indicative of one or more characteristics of the electric vehicle;
generate, at least partially based on the electric vehicle parameters, one or more features representative of a characteristic of a request for completing a power output proposal operation, and
propose a power output proposal for the electric vehicle;
wherein the electric vehicle is configured to operate according to the power output proposal.

11. The method of claim 1, wherein the range extender battery comprises a battery chemistry that is different than each chemistry of the traction battery.

12. The battery management system of claim 10, wherein the battery management system is further configured to charge the traction battery based on the at least one power output proposal.

13. The battery management system of claim 10, wherein the power control module is further configured to generate a set of attributes of the power supply system wherein the at least one power output proposal is further based on the attributes.

14. The battery management system of claim 13, wherein the attributes include a safety attribute of the power supply system, a capacity attribute of the power supply system or a life cycle attribute of the power supply system.

15. The battery management system of claim 10, wherein the power output proposal comprises instructions for the at least one HMC to manage a power generating mode of the power supply system.

16. The battery management system of claim 10, wherein the plurality of cells comprise at least once cell having a chemistry that prioritizes high energy density over available cycle life.

17. The battery management system of claim 10, wherein the power control module implements a machine learning algorithm to evaluate power output proposals including the at least one power output proposal for the electric vehicle.

18. The battery management system of claim 10, wherein the range extender battery comprises a battery chemistry that is different than each chemistry of the traction battery.

19. A non-transitory computer-readable storage medium comprising a plurality of instructions which, when executed by a computer processor, cause the processor to:
in a power supply system of an electric vehicle comprising a traction battery and a range extender battery separate from the traction battery, measure, by at least one hybrid module controller (HMC), parameters of a plurality of cells of the range extender battery;
receive the measured parameters as a part of a set of electric vehicle parameters, the electric vehicle parameters being indicative of one or more characteristics of the electric vehicle, for use by a power control module of the electric vehicle;
generate, at least partially based on the electric vehicle parameters, one or more features representative of a characteristic of a request for completing a power output proposal operation, and propose, using the power control module, at least one power output proposal for the electric vehicle.

20. A computer system comprising a processor configured to:

in a power supply system of an electric vehicle comprising a traction battery and a range extender battery separate from the traction battery, measure, by at least one hybrid module controller (HMC), parameters of a plurality of cells of the range extender battery;

receive the measured parameters as a part of a set of electric vehicle parameters, the electric vehicle parameters being indicative of one or more characteristics of the electric vehicle, for use by a power control module of the electric vehicle;

generate, at least partially based on the electric vehicle parameters, one or more features representative of a characteristic of a request for completing a power output proposal operation, and propose, using the power control module, at least one power output proposal for the electric vehicle.

* * * * *